US011689993B2

(12) United States Patent
Liu

(10) Patent No.: US 11,689,993 B2
(45) Date of Patent: Jun. 27, 2023

(54) INTERCEPTION AWARE ACCESS NODE SELECTION

(71) Applicant: Nokia Technologies Oy, Espoo (FI)

(72) Inventor: Jennifer Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/372,704

(22) Filed: Apr. 2, 2019

(65) Prior Publication Data
US 2019/0313234 A1 Oct. 10, 2019

Related U.S. Application Data

(60) Provisional application No. 62/652,828, filed on Apr. 4, 2018.

(51) Int. Cl.
*H04W 48/16* (2009.01)
*H04W 8/02* (2009.01)
*H04M 3/22* (2006.01)
*H04W 48/14* (2009.01)
*H04L 9/40* (2022.01)
(Continued)

(52) U.S. Cl.
CPC ........... *H04W 48/16* (2013.01); *H04L 63/304* (2013.01); *H04M 3/2281* (2013.01); *H04W 8/02* (2013.01); *H04W 12/80* (2021.01); *H04W 48/14* (2013.01); *H04W 48/20* (2013.01)

(58) Field of Classification Search
CPC ... H04W 48/18; H04W 84/042; H04W 84/12; H04W 88/06; H04W 8/02; H04W 12/007; H04W 40/20; H04W 4/02; H04W 4/50; H04W 48/14; H04W 48/16; H04W 12/80;
(Continued)

(56) References Cited

U.S. PATENT DOCUMENTS

2017/0295529 A1 10/2017 Kang et al.
2017/0332416 A1 11/2017 Kiss et al.
(Continued)

FOREIGN PATENT DOCUMENTS

| CN | 104869664 A | 8/2015 | |
|---|---|---|---|
| WO | 2016/161404 A1 | 10/2016 | |
| WO | WO-2016161404 A1 * | 10/2016 | ............ H04W 48/18 |

OTHER PUBLICATIONS

3GPP TS 23.402, Mar. 2018, V15.3.0, 309 pages. (Year: 2018).*
(Continued)

*Primary Examiner* — Quoc Thai N Vu
(74) *Attorney, Agent, or Firm* — Squire Patton Boggs (US) LLP

(57) ABSTRACT

In some example embodiments, there may be provided an apparatus including at least one processor and at least one memory including computer program code, the at least one memory and the computer program code configured to, with the at least one processor, cause the apparatus to at least: obtain information to enable selection of an access node for a non-GPP access; query a server to determine whether the country at which the access node is located requires lawful interception of communications; and select, based at least on the obtained information and/or a response to the query, the access node for the non-3GPP access. Related systems, methods, and articles of manufacture are also described.

25 Claims, 17 Drawing Sheets

(51) Int. Cl.
*H04W 48/20* (2009.01)
*H04W 12/80* (2021.01)
(58) Field of Classification Search
CPC .... H04W 48/20; H04L 65/102; H04L 63/304; H04L 63/306; H04M 3/2281
See application file for complete search history.

(56) References Cited

U.S. PATENT DOCUMENTS

| | | | | |
|---|---|---|---|---|
| 2017/0374018 | A1* | 12/2017 | Salkintzis | H04L 61/1511 |
| 2018/0103363 | A1* | 4/2018 | Faccin | H04W 84/12 |
| 2018/0199279 | A1* | 7/2018 | Baek | H04W 48/18 |
| 2018/0317157 | A1* | 11/2018 | Baek | H04W 76/11 |
| 2019/0116551 | A1* | 4/2019 | Faccin | H04W 48/17 |
| 2020/0280843 | A1* | 9/2020 | Foti | H04W 88/16 |

OTHER PUBLICATIONS

TS 24.302 V9.7.0, Sep. 2011, 53 pages. (Year: 2011).*
"3rd Generation Partnership Project; Technical Specification Group Core Network and Terminals; Numbering, addressing and identification (Release 15)", 3GPP TS 23.003, V15.3.0, Mar. 2018, pp. 1-118.
"3rd Generation Partnership Project; Technical Specification Group Core Network and Terminals; Access to the 3GPP 5G Core Network (5GCN) via non-3GPP access networks; Stage 3 (Release 15)", 3GPP TS 24.502, V0.4.0, Mar. 2018, pp. 1-23.
"3rd Generation Partnership Project; Technical Specification Group Services and System Aspects; System Architecture for the 5G System; Stage 2 (Release 15)", 3GPP TS 23.501, V15.1.0, Mar. 2018, pp. 1-201.
Kaufman et al., "Internet Key Exchange Protocol Version 2 (IKEv2)", RFC 5996, Internet Engineering Task Force (IETF), Sep. 2010, pp. 1-138.
International Search Report and Written Opinion received for corresponding Patent Cooperation Treaty Application No. PCT/EP2019/058241, dated Jun. 19, 2019, 15 pages.
Tentative Rejection received for corresponding Taiwan Patent Application No. 108112017, dated Dec. 25, 2019, 14 pages of Tentative Rejection and 5 pages of translation available.
"3rd Generation Partnership Project; Technical Specification Group Services and System Aspects; Architecture enhancements for non-3GPP accesses (Release 15)", 3GPP TS 23.402, V15.3.0, Mar. 2018, pp. 1-314.
Office action received for corresponding Bangladesh Patent Application No. 77/2019, dated Feb. 18, 2020, 1 page.
Office Action dated Nov. 25, 2020 corresponding to Vietnamese Patent Application No. 1-2020-05539, and English translation thereof.
Taiwanese Official Letter dated May 5, 2021 corresponding to Taiwan (R.O.C.) Patent Application No. 108112017, with English Summary thereof.
Japanese Office Action issued in corresponding Japanese Patent Application No. 2020-552398 dated Dec. 21, 2021, with English summary thereof.
"LS on New sub-domain for ePDG selection with DNS-based Discovery of Regulatory Requirements", 3GPP TSG-CT WG1 Meeting #97, C1-161737, Apr. 1, 2016.
First Examination Report issued in corresponding Indian Patent Application No. 202047047781 dated Dec. 7, 2021.
Office Action issued in corresponding Canadian Patent Application No. 3,095,423 dated Oct. 13, 2021.
Japanese Office Action corresponding to JP Application No. 2020-552398, dated Jun. 10, 2022.
China Telecom et al., "N3IWF FQDN", 3GPP TSG CT4 Meeting #80, Kochi, India, Oct. 23-27, 2017, C4-175286, 8 pages.
European Communication pursuant to Article 94(3) EPC corresponding to EP Application No. 19 715 458.6, dated Sep. 28, 2022.
Canadian Office Action corresponding to CA Application No. 3,095,423, dated Sep. 7, 2022.
Chinese Office Action corresponding to CN Application No. 201980023516.9, dated Oct. 31, 2022.
Japanese Office Action corresponding to JP Application No. 2020-552398, dated Dec. 7, 2022.
Indonesian Office Action corresponding to ID Application No. P00202007173, dated Feb. 22, 2023.

* cited by examiner

INTERCEPTION AWARE ACCESS NODE SELECTION

CROSS-REFERENCE TO RELATED APPLICATION

This application claims priority to and the benefit of U.S. Provisional Patent Application No. 62/652,828, filed Apr. 4, 2018, and entitled "INTERCEPTION AWARE ACCESS NODE SELECTION", which is hereby incorporated herein in its entirety for all purposes.

FIELD

The subject matter described herein relates to access node selection in 5G networks.

BACKGROUND

As the cellular system including the 5G network supports an increasing number of devices and services including applications with a wide range of use cases and diverse needs with respect to bandwidth, latency, and reliability requirements, the cellular system may need to prioritize resources across the wireless access network and the core network (and/or for example, prioritizing across the control plane and the user plane) to support differentiation among different service data flows (SDFs).

SUMMARY

Methods and apparatus, including computer program products, are provided for access node selection. In some example embodiments, there may be provided an apparatus including at least one processor and at least one memory including computer program code, the at least one memory and the computer program code configured to, with the at least one processor, cause the apparatus to at least: obtain information to enable selection of an access node for a non-GPP access; query a server to determine whether the country at which the access node is located requires lawful interception of communications; and select, based at least on the obtained information and/or a response to the query, the access node for the non-3GPP access. In another aspect of the invention, there is a step of obtaining information to enable selection of an access node for a non-cellular access, or an apparatus having a capability to perform obtaining information to enable selection of an access node for a non-cellular access. In another aspect of the invention, querying a server is to determine the access node. The querying may determine whether the country at which the access node is located requires use of a particular type of node in that country or even a particular node in that country. The access node may be at least one of a non-cellular interworking function and a gateway.

In some variations, one or more of the features disclosed herein including the following features can optionally be included in any feasible combination. The apparatus may be further caused to at least select between a first access node comprising a non-3GPP interworking function and a second access node comprising an evolved packet data gateway. The information may be obtained from a policy control function via an access management function, N2 interface, and/or N1 interface. The information may be obtained from a universal subscriber identity module. The information may include an identity of at least one non-3GPP interworking function, a preference for selecting non-3GPP interworking functions, and/or a preference information for selecting evolved packet data gateway. The apparatus may be further caused to at least receive a response to the query, the response including an indication of whether the country at which the non-3GPP access network is located requires lawful interception of communications and/or a list of one or more non-3GPP interworking function nodes supporting the lawful interception of communications. The apparatus may be further caused to at least perform the access to the non-3GPP access network via the selected access node.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
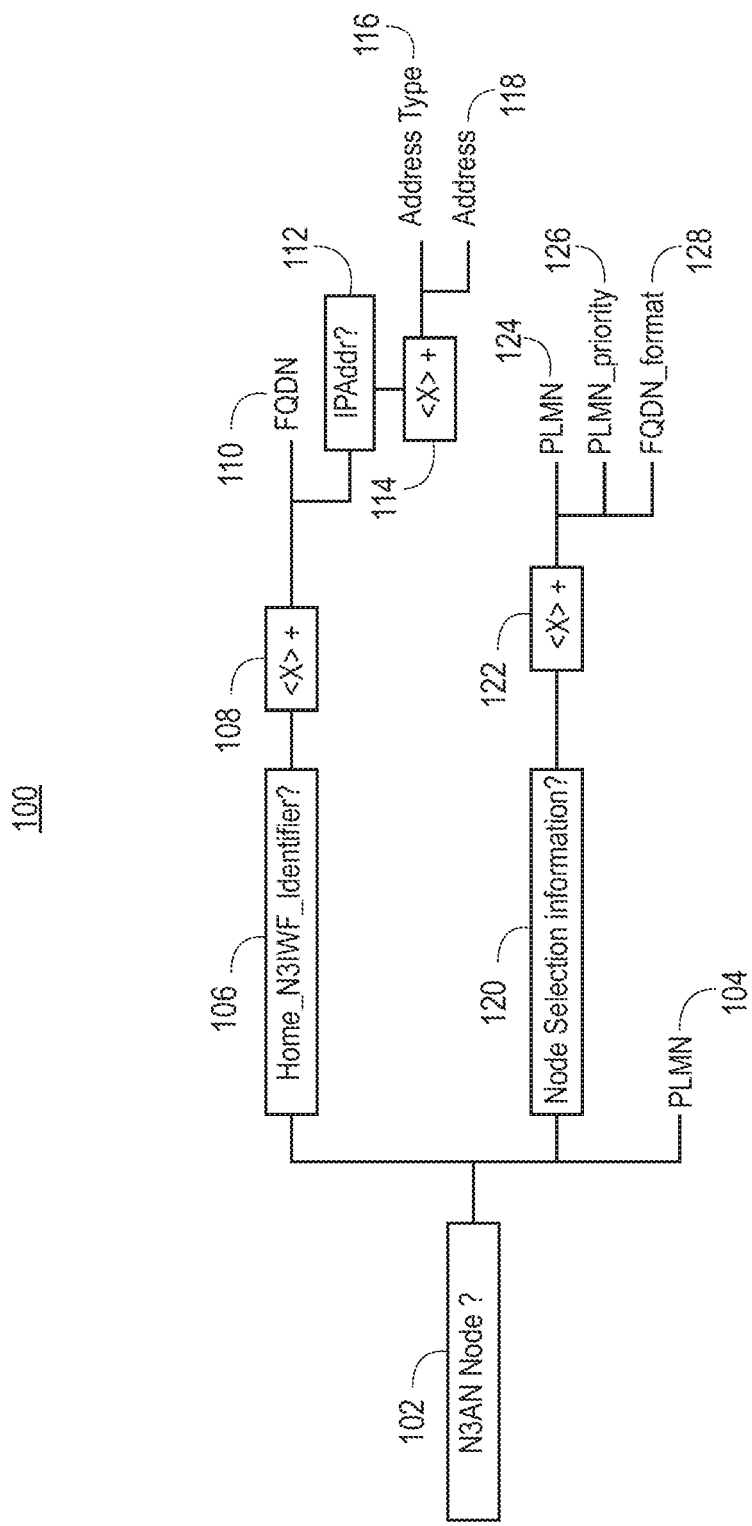
FIG. 1 depicts an example configuration management object and data model 100 supporting the N3IWF only selection, in accordance with some example embodiments.

Like labels are used to refer to same or similar items in the drawings.

DETAILED DESCRIPTION

In wireless networks including the 5G wireless network, a non-3GPP access network, such as a wireless local area network, may be considered or treated as a 5G access network and thus be handled as part of the 5G System (5GS). When there is an untrusted non-3GPP access such as an untrusted wireless local area network, a non-3GPP (N3G) access node's non-3GPP interworking function (N3IWF) may provide termination of the N2 interface for the control plane and the N3 interface for the user plane. The term "non-3GPP access" refers to access that is not via a 3$^{rd}$ Generation Partnership Project cellular radio access network. Examples of "non-3GPP" access include access via a wireless local area network, such as WiFi and/or the like. These examples can also be considered to be "non-cellular" access.

The N3IWF provides the interworking to enable a UE to attach to the 5G core via a trusted non-3GPP access or via untrusted non-3GPP access. The 5G capable user equipment (UE) may access the 5G core network by connecting to the non-3GPP access network via the N3IWF. The N3IWF may relay, via the N1 interface, uplink and downlink control plane network access stratum (NAS) signaling between the UE and the access management function (AMF) to enable the UE to have a direct NAS signaling connection towards the AMF. Moreover, the N3IWF may provide user plane connection(s) between the UE and the user plane function (UPF) for the protocol data unit (PDU) sessions over non-3GPP (N3G) access.

Depending on the UE's mobility status however, there may be a variety of different ways for the UE to select an access function, such as the N3IWF, evolved packet data gateway (ePDG), and/or a combination of the two. The N3IWF selection may impact both control plane signaling and user plane packet transport. Accordingly, there may be a need to have a flexible access node selection mechanism to enable the 5G system efficiency over non-3GPP access.

Wireless networks have various strategies for the 4G to 5G transition for non-3GPP access, such as wireless local area networks (for example, WiFi and the like). The network may prefer the UE to select an N3IWF or an evolved packet core gateway (ePDG) based on the network's upgrade or migration status from 4G to 5G. For example, the network may be configured to prefer that a 5G capable UE select the N3IWF, but if N3IWF is not available, the network may be configured to prefer the 5G cable UE to select the ePDG, so the 5G capable UE can still obtain services.

Another consideration is due to the 5G network being a data centric network, which may cause lack of native support for voice services. If voice over IMS ("VoIMS") in 5GS is not supported for example, the 5G capable UE may have to attach to another network, such as a 4G network. This UE may then need to behave like a 5G-non-capable UE in order for this UE to attach to evolved packet core. In this example, the UE may not indicate to the mobility management entity (MME) that it is 5G capable, and as part of a non-3GPP access, the UE may need to select an ePDG for handover support.

Furthermore, the lawful interception of communications requirement on the network may also be considered for non-3GPP access node selection for the 5G system. Some countries consider a 3GPP operator within their jurisdiction providing non-3GPP access services, such as WIFI, as offering regulated services. In these jurisdictions, the network operator may need to configure the network to provide lawful interception for roaming users. However, it will be understood in view of the preceding description that the lawful interception of communications requirement applies to certain aspects of the invention and is not relevant to other aspects of the invention.

In a network including the ePDG and N3IWF support, the network may need to upgrade the ePDG(s) into a combined N3IWF/ePDG node. As such, there may be a need to define an access node selection mechanism for the 5G system to enable the UE to select an appropriate access node both in the home public land mobile network (HPLMN) and while roaming in networks including the visiting public land mobile networks (VPLMNs). The mechanism may need to be based on the UE's connectivity capability, such as whether the UE supports connectivity to N3IWF, ePDG, or both. Furthermore, there is need to define a configuration data model to allow flexibility to support access node selection for different deployment scenarios, including normal and abnormal cases.

In some example embodiments, there may be provided selection of an access node for the non-3GPP access network (N3AN). Moreover, the selection of the N3AN access node may be performed in an intercept-aware manner so that a selection of the access node, such as a N3IWF, takes into account whether a jurisdiction requires lawful interception of communications for non-3GPP access, such as wireless local area networks including WiFi and the like.

In some example embodiments, there may be defined a non-3GPP access network's node configuration data model and management object (MO) for N3IWF selection over an untrusted non-3GPP access network.

In some example embodiments, there may be defined a non-3GPP access network node's configuration data model and management object for a combined N3IWF/ePDG node.

In some example embodiments, there may be defined handling logic to enable interception-aware N3IWF selection including when the UE only supports connectivity to N3IWF and/or when the UE supports connectivity to both N3IWF and ePDG.

In some example embodiments, there may be provided an configuration management object and data model for access node selection, such as N3IWF selection over an untrusted non-3GPP access network. A network node, such as a policy control function (PCF) in the UE's home public land mobile network (HPLMN), may provide, to a UE, this configuration information including N3IWF selection information. Moreover, the visiting network, such as the visiting public land mobile network (VPLMN), may be configured to provide the N3IWF configuration information for UEs roaming in the VPLMN.

In some example embodiments, the non-3GPP access network node configuration information may include a home N3IWF identifier and/or N3IWF node selection information. When available in the configuration management object, the non-3GPP access network's node configuration information may be provisioned in a node of the non-3GPP access network. And when available in the universal subscriber identity module (USIM), the non-3GPP access network node configuration information may be provisioned in elementary files (EF).

FIG. 1 depicts an example N3AN node configuration management object and data model 100 supporting the N31WF only selection, in accordance with some example embodiments. The object 100 may provide information to enable configuration of access node selection, such as the selection of the N3IWF, ePDG, or both. For example, the object may be provided by a PCF to a UE, so that the UE can select an non-3GPP access node, N3IWF, ePDG, or both.

The object 100 may include N3AN_Node information 102. The N3AN_node information 102 may serve as a node providing a placeholder for the non-3GPP access network's access node configuration information.

The object 100 may further include a PLMN 104 leaf. The PLMN 102 may include a public land mobile network (PLMN) code identifying the operator or network, such as the network operator that created the policy corresponding to object 100. The PLMN leaf 104 may have an occurrence of one, a format of character, and support access types such as get or replace. In some example embodiments, the format of the PLMN leaf is defined by a standard, such as 3GPP TS 23.003. If the value of the PLMN leaf is equal to the HPLMN (or an equivalent HPLMN) of the UE, the rule represented by the policy of object 100 may be considered as valid. However, if the value of the PLMN leaf is neither the HPLMN (nor an equivalent HPLMN), then the rule represented by the policy of object 100 may be ignored.

The object 100 may further include a Home_N3IWF_Identifier 106. The Home_N3IWF_Identifier 106 may represent a node in the object and act as a placeholder for a list of the N3IWF(s) in the UE's HPLMN.

The Home_N3IWF_Identifier node 106 may be associated with a node <X>108. The node <X>108 may represent a node in object 100 and serve as a placeholder for a fully qualified domain name (FQDN) or an IP address configuration of an N3IWF in the UE's HPLMN.

The <X>108 may be associated with FQDN leaf 110. The FQDN leaf may indicate the FQDN of an N3IWF in the UE's HPLMN. The value of the FQDN leaf may be based on the N3IWF FQDN format for non-emergency bearer services as defined by a standard, such as 3GPP TS 23.003. In some example embodiments, the absence of FQDN leaf 108 may indicate that the FQDN is not configured (by the home operator) for this N3IWF in the UE's HPLMN by the home operator.

The <X>108 may be associated with an IPAddr 112. The FQDN IPAddr 112 may serves as a node acting as a placeholder for a list of IP addresses of N3IWFs in the UE's HPLMN. In some example embodiments, the absence of this node 112 may indicate that IP address is not configured (by the home operator) for this N31WF in the UE's HPLMN.

The IPAddr 112 may be associated with a <X> node 114. This node 114 may act as a placeholder for an IP address of an N3IWF in the UE's HPLMN.

The <X> node 114 may be associated with an AddressType 116. The address type leaf 116 indicates the IP version, such as the type, of an IP address of an N31WF in the UE's HPLMN.

The <X> node 114 may be associated with an Address 118. The address leaf 118 indicates the IP address of an N3IWF in the UE's HPLMN. The value of this leaf is an IPv6 address of the type indicated by AddressType 116.

The N3AN Node 102 may further include a NodeSelectionlnformation 120. The NodeSelectionlnformation 120 acts as a node providing a placeholder for the FQDN format and selection information for a list of public land mobile networks (PLMNs).

When the NodeSelectionlnformation 120 node is present (and has a value so it is not empty), the UE may retrieve N3IWF selection policy and the FQDN format setting(s) for a PLMN. This retrieval may be as follows:

If configuration for the PLMN can be found, the UE may apply the corresponding configuration information of the PLMN for N3IWF selection.

If configuration for the UE's PLMN ID cannot be found but there exists an <X> node 122 with the PLMN leaf 124 set to "Any_PLMN" value, the UE may apply the configured information of "Any PLMN" value for N3IWF selection.

In other cases including the cases where the NodeSelectionlnformation node is not present or the NodeSelectionlnformation node is present but empty, the UE may consider that pre-configuration information for the UE's PLMN does not exist. The UE may select the N3IWF of the HPLMN in accordance with a standard such as 3GPP TS 24.502.

In some example embodiments, only those PLMNs that have roaming agreements with the HPLMN for interworking with untrusted non-3GPP access, such as WLANs, may be provisioned in the NodeSelectionlnformation 120. The UE's HPLMN may also be included in the list of PLMNs.

The NodeSelectionlnformation 120 may be associated with <X> node 122. The <X> node 122 may as a placeholder for the N3IWF FQDN format, selection information, and PLMN priority setting for a PLMN.

The <X> node 122 may be associated with a PLMN leaf 124 which indicates a PLMN code. The PLMN leaf 124 may have values of <PLMN> or 'Any_PLMN". The format of the PLMN may be defined in accordance with a standard such as 3GPP TS 23.003. If the UE's PLMN ID is same as the PLMN value stored in the PLMN leaf, configuration for this PLMN from home operator is available or found.

The <X> node 122 may be associated with a PLMN_Priority 126 leaf. The PLMN_Priority leaf represents the preference order given to N3IWFs of a PLMN and is represented as a numerical value. The PLMN_Priority 126 may have values of the PLMN priority. When more than one PLMN entry exists for example, the UE may treat the entry with the lowest PLMN Priority value as the entry having the highest priority among the valid entry. If the PLMN is the UE's HPLMN, the PLMN_priority of the PLMN entry may be ignored even when provisioned.

The <X> node 122 may be associated with an FQDN_format 128. The FQDN_format leaf 128 indicates whether an operator identifier FQDN format or a location based FQDN format is used, when the FQDN is constructed by the UE. To illustrate further, a value of zero may indicate that the operator identifier FQDN format is used in accordance with a standard, such as 3GPP TS 23.003, while a value of 1 may indicate that a Tracking Area Identity FQDN format is used in accordance with a standard, such as 3GPP TS 23.003). In some example embodiments, the default value 0 may be applied if this leaf is not provisioned. The FQDN_format value may be used by the UE when constructing FQDN as follows:

If Tracking Area Identity FQDN format is to be used, the UE may construct the Tracking Area identity FQDN using the PLMN ID of the PLMN the UE is attached to and track area code (TAC) of the area that the UE is located in.

Otherwise, the UE may construct the operator identifier FQDN using the PLMN ID of the PLMN the UE is attached to.

Figure 2A:
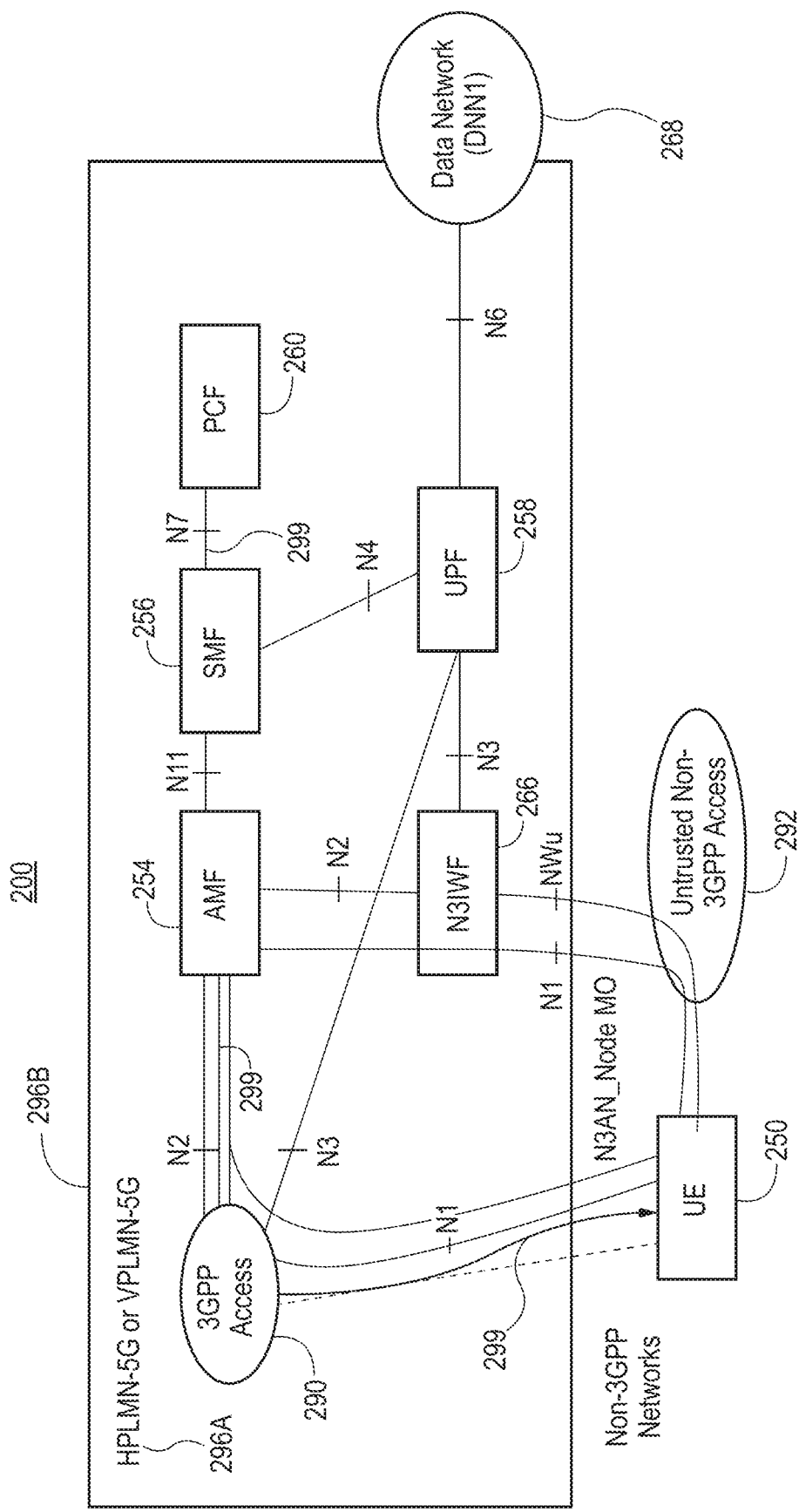
FIG. 2A depicts an example of a portion of a network including a user equipment having 3GPP access and a non-3GPP access, in accordance with some example embodiments.

FIG. 2A depicts an example of a portion of a network 200 including a user equipment (UE) 250 having 3GPP access 290 (for example, via a cellular base station) to a HPLMN 296A and a non-3GPP access 292 (which in this example is untrusted) to the HPLMN 296A. Although FIG. 2A depicts HPLMN 296A, the VPLMN may be implemented as well to include one or more of the devices 254-266 shown.

FIG. 2A also depicts the HPLMN 296 including an access and mobility management function (AMF) 254, a session management function (SMF) 256, a policy control function (PCF) 260, a user plane function (UPF) 258, a N3IWF 266, and a data network 268. In the example of FIG. 1, devices 254-266 may be associated with the home public land mobile network (HPLMN) 296A. FIG. 2A also depicts service interfaces, such as N1, N2, N3, N4, N6, N6, N7, N11, and/or the like. The architecture, nodes (including N3IWF, AMF, PCF, SMF, SMF as well as other devices depicted at FIG. 2A), and the service interfaces may be defined in accordance with a standard, such as 3GPP TS 23.501, although other standards as well as proprietary interfaces may be used.

FIG. 2A depicts a node in the UE's 250 home network, such as PCF 260, providing the N3IWF node configuration information 299 (labeled as N3AN_Node MO, such as object 100) to the UE via the N7 interface, SMF 256, N11 interface, AMF 254, and/or the like. Alternatively, the N3IWF node configuration information may be provided to the UE 250 via user subscriber identity module (USIM) provisioning.

In some example embodiments, the UE 250 may perform a query to determine whether the visited country mandates the selection of N3IWF in that visited country. In order to determine if the visited country mandates the selection of N3IWF in that visited country, the UE may perform the DNS name authority pointer (NAPTR)_query using the visited country FQDN as follows:

n3iwf.5gc.mcc<MCC>.visited-country.pub.3gppnetwork.org.

If the result of the UE's 250 query is a set of one or more records including the service instance names of the form "n3iwf.5gc.mnc<MNC>.mcc<MCC>.pub.3gppnetwork.org" (where the mobile country code (MCC) and mobile network code (MNC) pair in each record represents the PLMN Id in the visited country), the UE may determine that the visited country mandates the selection of the N3IWF in the corresponding visited country.

However, if the query returns no records including the service instance names of the form "n3iwf.5gc.mnc<MNC>.mcc<MCC>.pub.3gppnetwork.org", the UE may determine that the visited country does not mandate the selection of the N3IWF in the corresponding visited country.

In some example embodiments, the UE 250 may select an N3IWF such as N3IWF 266, when the UE supports connectivity with N3IWF but does not support connectivity with ePDG. For example, the UE may perform an N3IWF selection based on the non-3GPP access node configuration information 299 (which may be formatted as object 100) provided by the PCF 260 to the UE 250. Moreover, the UE's selection of N3IWF may be based on the UE's knowledge of the country the UE is located in and the PLMN the UE is attached to.

If the UE only supports connectivity with N3IWF and does not support connectivity with ePDG, the UE may ignore the ePDG related configuration parameters if available in the non-3GPP access node configuration information 299, when selecting an N3IWF. For example, the UE may ignore the home ePDG identifier and the ePDG preferred parameter of the object 100.

Figure 2B:
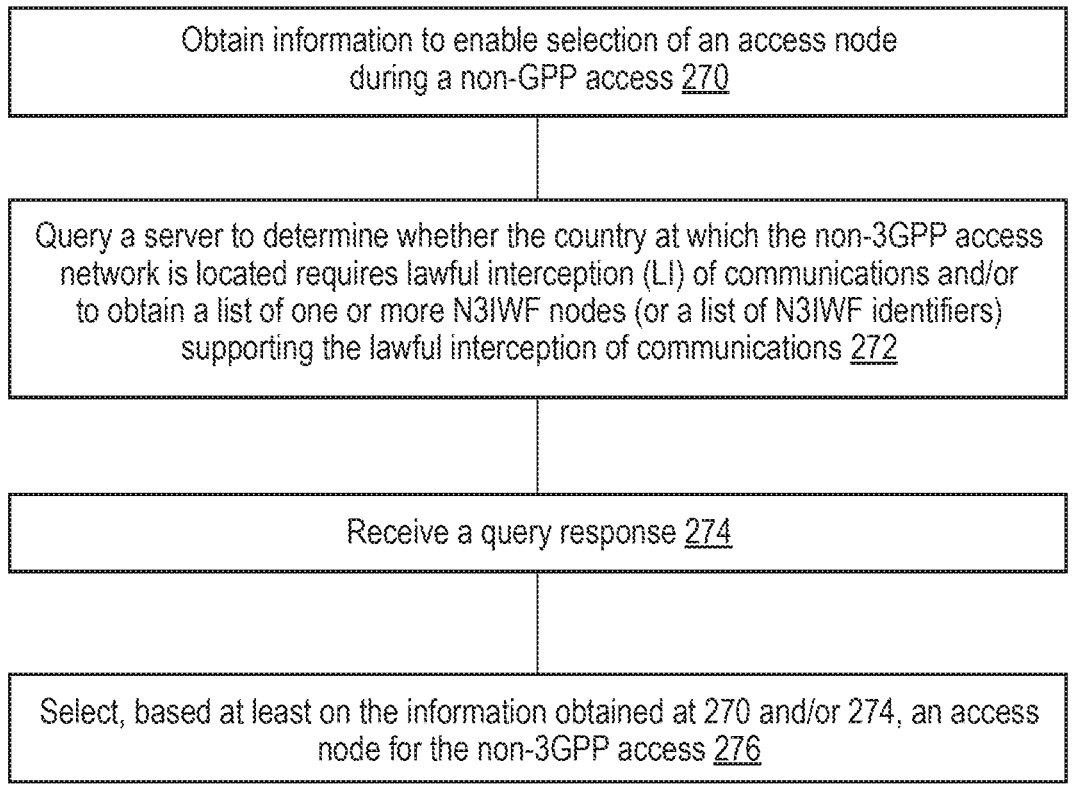
FIG. 2B depicts an example of a process, in accordance with some example embodiments.

FIG. 2B depicts an example process, in accordance with some example embodiments. The description of FIG. 2B also refers to FIG. 2A and FIG. 1.

At 270, the UE 250 may obtain information to enable selection of an access node during a non-GPP access, in accordance with some example embodiments. For example, the UE may be attempting access to an untrusted non-3GPP access network, such as a WLAN, WiFi network, and/or the like. To that end, the UE may access the obtained information to select the access node to select for the non-3GPP network access. In some example embodiments, the UE may obtain the information, as an object such as object 100, object 500 (described below), and/or the like. Moreover, the object may be received from a policy control function 260 via the N7 interface, SMF 256, AMF 254, N2 interface, and/or N1 interface. Moreover, the obtained information may identify a list of one or more N3IWFs, which can be selected, preference information for N3IWFs, preference information for ePDG, emergency services provided, support for voice, and/or other information disclosed herein including objects 100, 500, and/or the like. Although the UE 250 may obtain the information via the PCF, the information may also be provided via USIM provisioning.

At 272, the UE 250 may, in accordance with some example embodiments, query a server to determine whether the country at which the non-3GPP access network is located requires lawful interception (LI) of communications and/or to obtain a list of one or more N3IWF nodes (or a list of N3IWF identifiers) supporting the lawful interception of communications. In response to the query, the UE may receive, at 274, a response indicating whether the country at which the non-3GPP access network is located requires lawful interception (LI) of communications and/or a list of one or more N3IWF nodes (or a list of N3IWF identifiers) supporting the lawful interception of communications.

At 276, the UE 250 may select, based at least on the information obtained at 270 and/or 274, an access node for the non-3GPP access, in accordance with some example embodiments. For example, the UE may select between a N3IWF (which supports 5G compliant access) and an ePDG (which supports 4G compliant access) to access the non-3GPP access network and the core network. To illustrate further, the UE may select the ePDG if ePDG is preferred at a certain location or network. Alternatively or additionally, the UE may select the N3IWF if N3IWF is preferred at a certain location or network. Alternatively or additionally, the UE may select the N3IWF due to the lawful interception of communications requirements of a jurisdiction. Alternatively or additionally, the UE may select the N3IWF or ePDG based on the availability of services, such as emergency services, voice service, and/or the like.

At 278, the UE 250 may perform the access to the non-3GPP access network via the selected node, such as the N3IWF or ePDG, in accordance with some example embodiments.

Figure 3A:
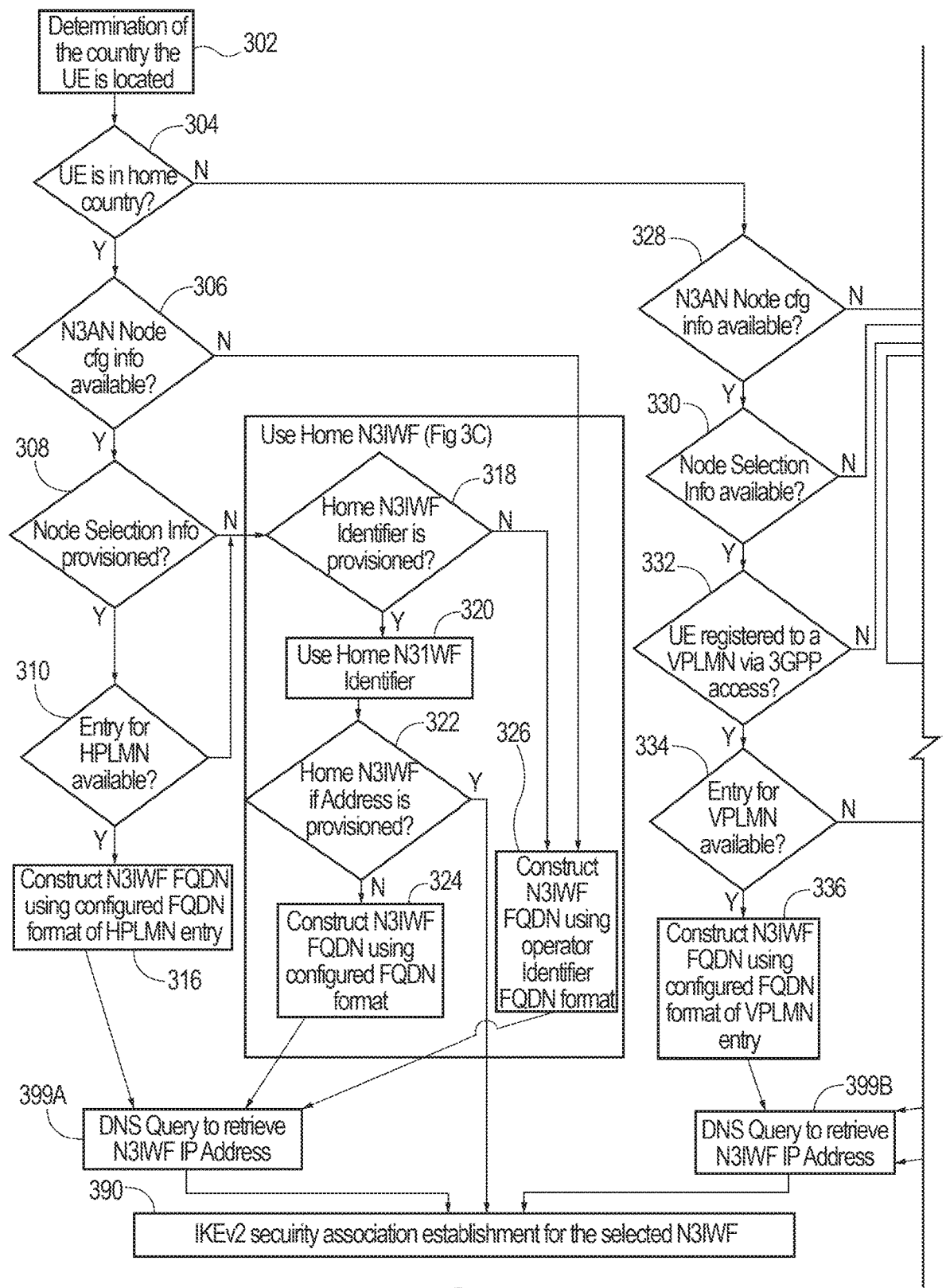
FIG. 3A-3C depict a non-3GPP access network N3IWF node selection logic, in accordance with some example embodiments.
Figure 3B:
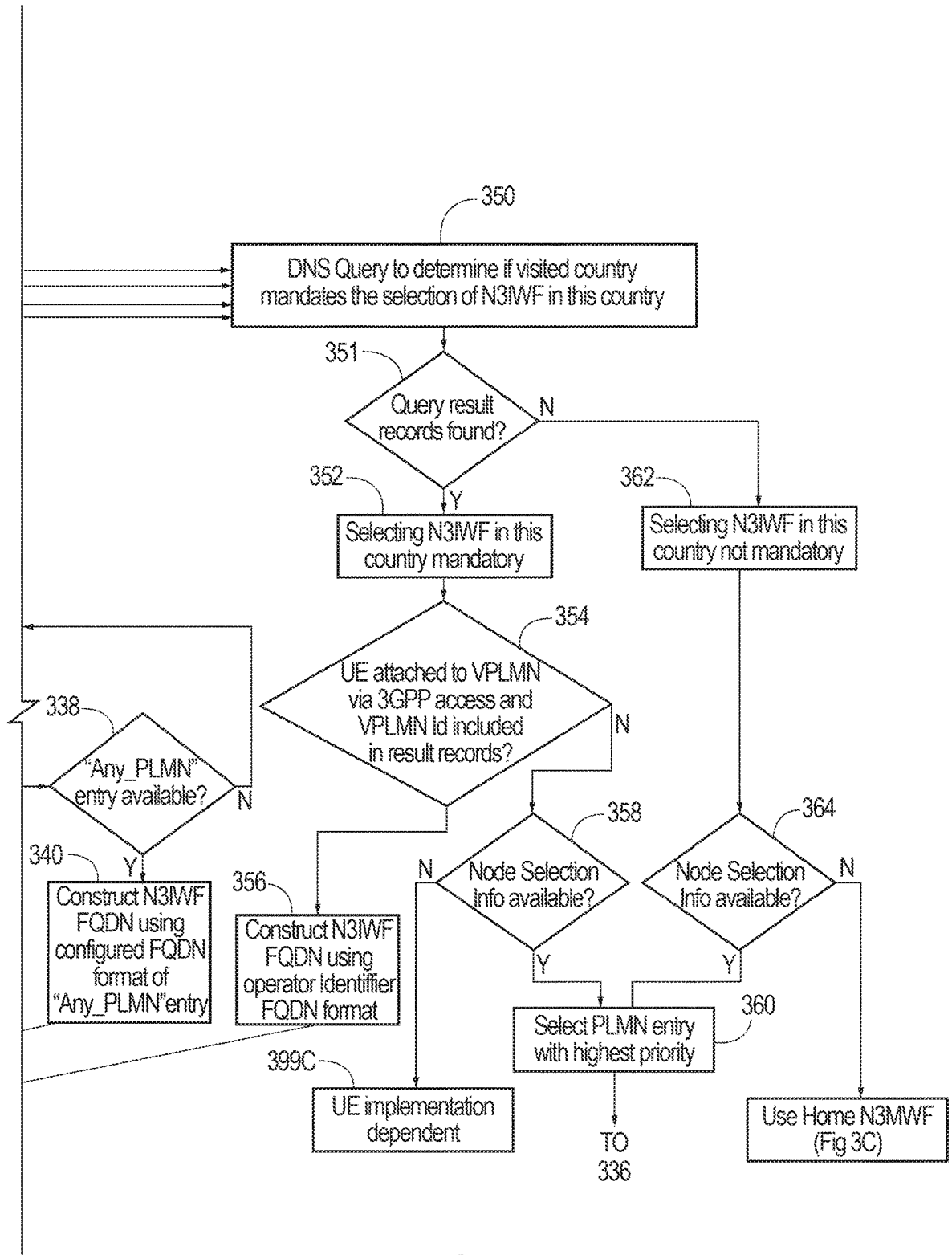

FIG. 3A depicts the non-3GPP access network N3IWF node selection logic, in accordance with some example embodiments. The process depicted at FIG. 3A may use configuration information and selection information from the objects, such as object 100 and/or the like provisioned at the UE. In this way, the UE 250 may select, for non-3GPP access (which may be untrusted), an access node, such as the N3IWF, ePDG, or both.

If it is determined that the UE 250 is located in its home country (302 and Y at 304), the N3AN node selection information (Y at 308) is provisioned in the N3AN node configuration information (Y at 306), an entry for the HPLMN is available in the N3AN node selection information (Y at 310), the UE may construct, at 316, an N3IWF FQDN based the configured FQDN format of HPLMN.

If however, the N3AN node selection information is not provisioned in the N3AN node configuration information (N at 308) or the N3AN node selection information is provisioned and an entry for the HPLMN is not available in the N3AN node selection information (Y at 308 and N at 310), the UE may proceed as follows:

a) If the home N3IWF identifier is provisioned in the N3AN node configuration information (Y at 318), the UE may use, at 320, the configured IP address to select the N3IWF, but if configured IP address is not available (N at 322), the UE may construct, at 324, an N3IWF FQDN using the configured FQDN.

b) If the Home N3IWF identifier is not provisioned (N at 318) in the N3AN node configuration information, the UE may construct, at 326, an N3IWF FQDN based on the Operator Identifier FQDN format using the PLMN ID of the HPLMN.
c) If the N3AN node configuration information is not configured on the UE (N at 306) or the N3AN node configuration information is configured but empty, the UE may construct, at 326, the N3IWF FQDN based on the Operator Identifier FQDN format using the PLMN ID of the HPLMN stored on the USIM.

In some example embodiments, the UE may use, at 399A, the DNS server function to resolve the constructed N3IWF FQDN to the IP address(es) of the N3IWF(s). The UE may select an IP address of an N3IWF with the same IP version as its local IP address.

If however the UE is not located in its home country (N at 304), the N3AN node selection information is provisioned in the N3AN node configuration information Y 328 and Y at 330, the UE is registered to a VPLMN via 3GPP access (Y at 332), and an entry for the VPLMN is available in the N3AN node selection information (Y at 334), the UE may construct, at 334, an N3IWF FQDN based on configured FQDN format of the VPLMN. In some example embodiments, the UE may use the DNS server function to resolve the constructed N3IWF FQDN to the IP address(es) of the N3IWF(s). The UE may select an IP address of an N3IWF with the same IP version as its local IP address If however the UE is not located in its home country (N at 304), the N3AN node selection information is provisioned in the N3AN node configuration information (Y 328 and Y at 330), the UE is registered to a VPLMN via 3GPP access (Y at 332), an entry for the VPLMN is not available in the N3AN node selection information (N at 334), and an 'Any_PLMN' entry is available in the N3AN node selection information (Y at 338), the UE may construct, at 340, an N3IWF FQDN based on the configured FQDN format of the 'Any_PLMN' entry. In some example embodiments, the UE may use, at 399B, the DNS server function to resolve the constructed N3IWF FQDN to the IP address(es) of the N3IWF(s). The UE may select an IP address of an N3IWF with the same IP version as its local IP address Returning to the UE not being located in its home country (N at 304), the UE may perform, at 350, a DNS query to determine if the visited country mandates the selection of N3IWF in this country if at least one of the following is true:
the UE is not registered to a PLMN via 3GPP access and the UE uses WLAN (N at 332);
the N3AN node configuration information is not available (N at 328);
the N3AN node selection information is not provisioned in the N3AN node configuration information (N at 330); and/or
the UE is registered to a VPLMN via 3GPP access (Y at 332), an entry for the VPLMN is not available in the N3AN node selection information (N at 334), and an 'Any_PLMN' entry is not available in the N3AN node selection information (N at 338).

If the selection of N3IWF in visited country is mandatory (Y at 351 and 352) and the UE is registered to a VPLMN via 3GPP access and the PLMN ID of VPLMN is included in one of the returned DNS records (Y at 354), the UE may select an N3IWF in this VPLMN by constructing, at 356, an N3IWF FQDN based on the Operator Identifier FQDN format using the PLMN ID of the VPLMN.

If the selection of N3IWF in visited country is mandatory (Y at 351 and 352) and the UE is not registered to a PLMN via 3GPP access or the UE is registered to a VPLMN via 3GPP access and the PLMN ID of VPLMN is not included in any of the DNS records (N at 354) and:
If the N3AN node selection information is provisioned (Y at 358), the UE may select, at 360, an N3IWF from a PLMN included in the DNS response that has highest PLMN priority in the N3AN node selection information and constructs an N3IWF FQDN based on the configured FQDN format of the PLMN entry; or
If the N3AN node selection information is not provisioned (N at 358) or the N3AN node selection information does not contain any of the PLMNs in the DNS response, selection of the PLMN is UE implementation specific. For example, the UE may select, at 399C, an N3IWF from a PLMN included in the DNS response and construct an N3IWF FQDN based on the Operator Identifier FQDN format using the PLMN ID of the PLMN.

As noted, the UE may use the DNS server function to resolve the constructed N3IWF FQDN to the IP address(es) of the N3IWF(s). The UE may select an IP address of an N3IWF with the same IP version as its local IP address.

Figure 3C:
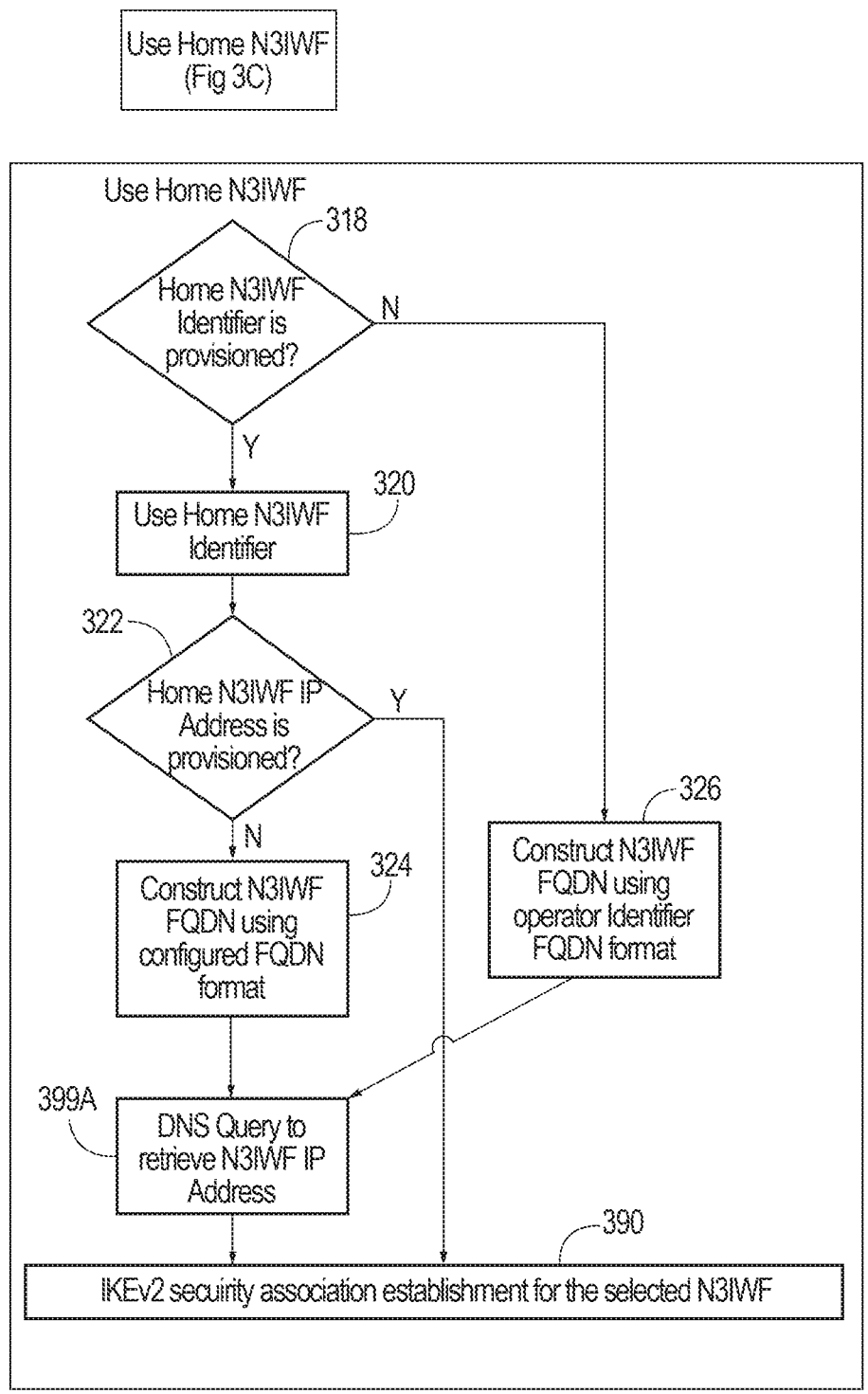

If the DNS response contains no records (N at 351), selection of N3IWF in visited country is not mandatory at 362. If the N3AN node selection information is provisioned and contains one or more PLMNs in the visited country (Y at 364), the UE may select, at 360, an N3IWF from a PLMNs that has highest PLMN priority in the N3AN node selection information. If the N3AN node selection information is not provisioned or if the N3AN node selection information is provisioned and contains no PLMNs in the visited country (N at 364), the UE may select an N3IWF in accordance with FIG. 3C as follows:
If the Home N3IWF identifier is provisioned in the N3AN node configuration information (Y at 318 and 320), the UE uses the configured IP address to select the N3IWF, or if configured IP address is not available, use the configured FQDN and run DNS query, at 399A, to obtain the IP address(es) of the N3IWF(s); and
If the Home N3IWF identifier is not provisioned in the N3AN node configuration information (N at 318), the UE may construct, at 326, an N3IWF FQDN based on the Operator Identifier FQDN format using the PLMN ID of the HPLMN.

The UE may use, at 399A, the DNS server function to resolve the constructed N3IWF FQDN to the IP address(es) of the N3IWF(s). The UE may select an IP address of an N3IWF with the same IP version as its local IP address.

In some example embodiments, if no DNS response is received at 351, the UE may terminate the N3IWF selection procedure.

When the UE may select the IP address of the N3IWF, the UE may initiate, at 390, and Internet key exchange, such as an Internet Key Exchange Security Association (SA) which may be in accordance with RFC 5996, Internet Key Exchange Protocol Version 2 (IKEv2).

If selecting an N3IWF in the HPLMN fails, the selection of N3IWF in the HPLMN is performed using Home N3IWF identifier configuration, and there are more pre-configured N3IWFs in the HPLMN, the UE may repeat the security association tunnel establishment attempt using the next FQDN or IP address of the N3IWF in the HPLMN.

Upon reception of a DNS response containing one or more IP addresses of N3IWFs, the UE may select an IP address of N3IWF with the same IP version as its local IP address. If the UE does not receive a response to an IKE_SA_INIT request message sent towards to any of the received IP addresses of the selected N3IWF, the UE may repeat the N3IWF selection procedure, excluding the N3IWFs for which the UE did not receive a response to the IKE_SA_INIT request message.

Figure 4:
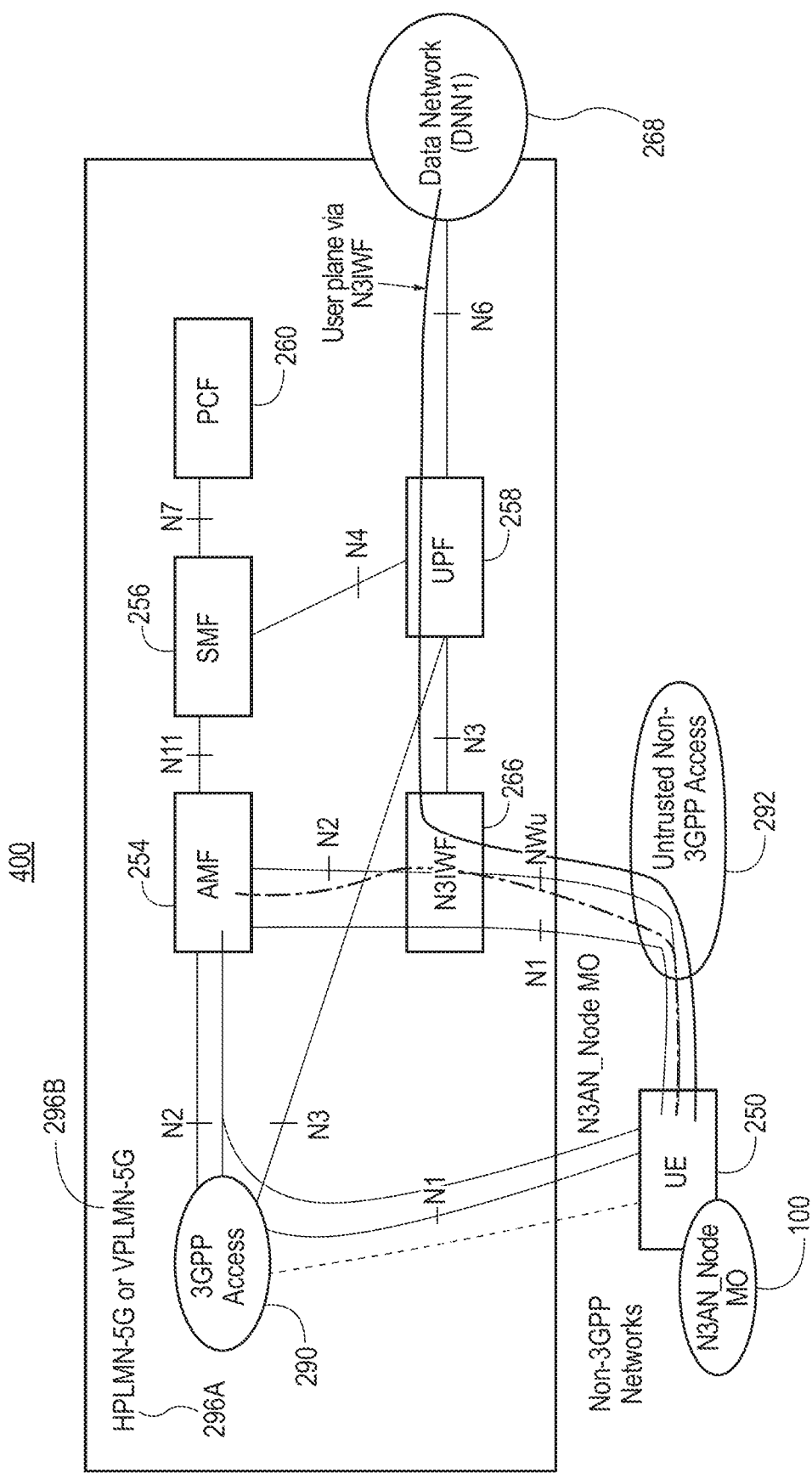
FIG. 4 depicts an example of a portion of a network including a user equipment having 3GPP access and a non-3GPP access, in accordance with some example embodiments.

FIG. 4 depicts an example of a portion of a network 400 including a user equipment (UE) 250 having 3GPP access 290 and a non-3GPP access 292 (which in this example is untrusted). The UE also includes object 100 provided by the PCF 260. FIG. 4 depicts the UE's 250 connectivity to the data network 268 after the IKEv2 signaling security association at 390 and user plane security association establishment that occurs after N3IWF selection.

Figure 5:
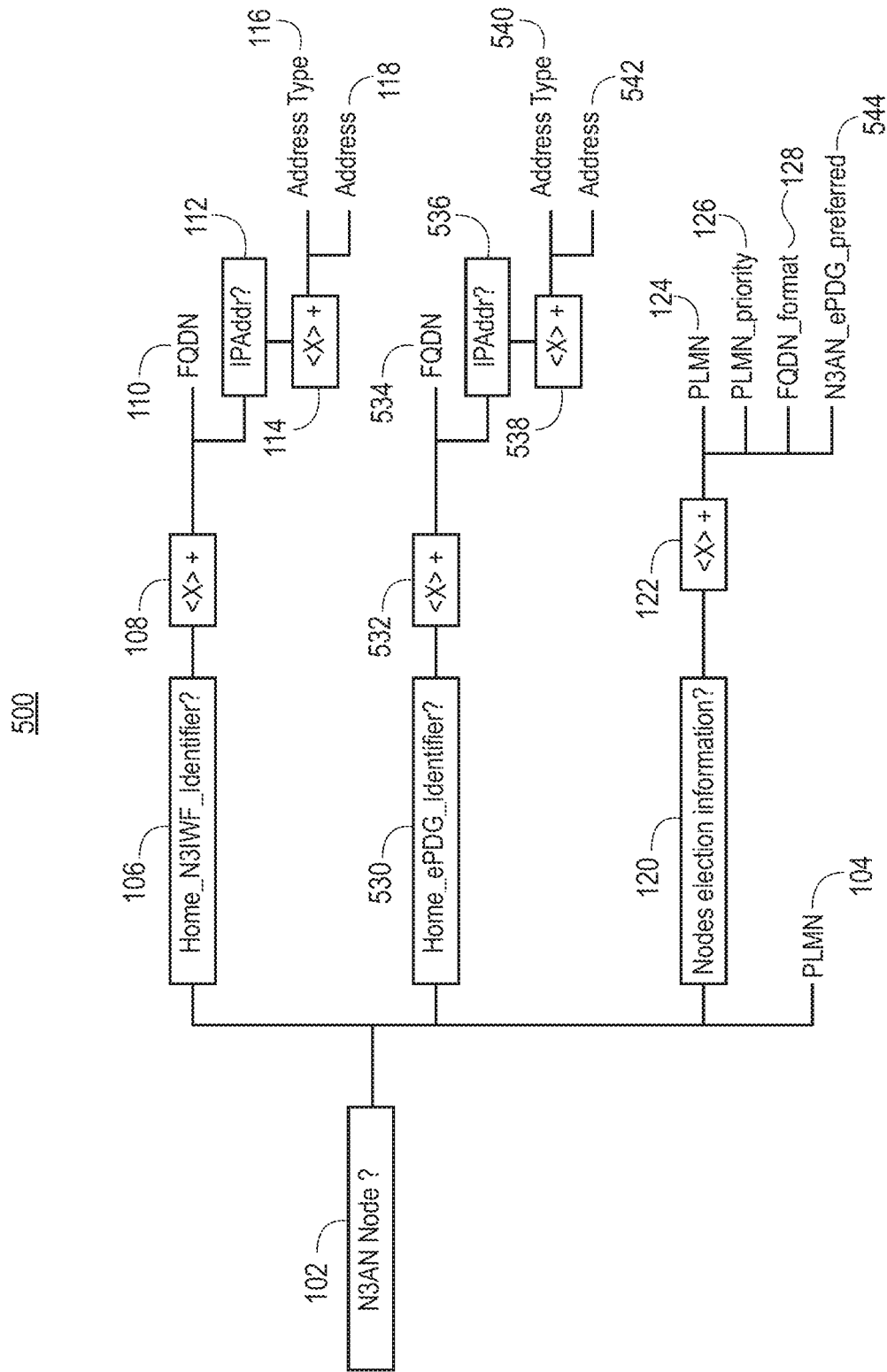
FIG. 5 depicts a management object, in accordance with some example embodiments.

FIG. 5 depicts a management object 500 (also referred to as an object), in accordance with some example embodiments. Object 500 is similar to object 100 but further includes aspects for the ePDG.

The non-3GPP access node configuration information may include the home N3IWF identifier, home ePDG identifier, and/or the N3IWF selection information. When the non-3GPP access node configuration information is available in a management object, such as object 100 (see, e.g., FIG. 1 and FIG. 4), the non-3GPP access node (N3AN) node configuration information may be provisioned in the N3AN node of the object 500. When the N3AN node configuration information is available in USIM however, the N3AN node configuration information may be provisioned in EF files.

The NodeSelectionInformation 120 may be associated with an N3AN_ePDG_preferred 544 leaf. The N3AN_node_ preferred leaf may indicate whether the N3IWF or ePDG is preferred for a given PLMN. The leaf 544 may have values of zero or 1. For example, a value of zero may indicate that N3IWF is preferred and ePDG is not preferred (in accordance with 3GPP TS 24.502), while a value of 1 may indicate that N3IWF is not preferred and ePDG is preferred (in accordance with 3GPP TS 24.502). A default value of zero may be applied if the leaf 544 is not provisioned at object 500.

The N3AN node 102 may be associated with a Home_ePDG_Identifier 530. The Home_ePDG_Identifier node 530 may act as a placeholder for the list of the ePDGs in the UE's HPLMN. The node 530 may have an occurrence of zero or one, a format of node, and support access types such as get or replace.

The Home_ePDG_Identifier 530 may be associated with a <X> node 532. This node 532 may serve as a placeholder for the FQDN or IP address configuration of an ePDG in the UE's HPLMN.

The <X> node 532 may be associated with am FQDN leaf 534. This leaf 534 may indicate the FQDN of an ePDG in the UE's HPLMN. The leaf 534 may have values that are FQDN(s). The value of leaf 534 may be based on ePDG FQDN format for non-emergency bearer services as defined in 3GPP TS 23.003. The absence of leaf 534 may indicate that FQDN is not configured for this ePDG in the UE's HPLMN by the home operator.

The <X> node 532 may be associated with an IPAddr node 536. This node 536 may serve as a placeholder for the list of IP addresses of ePDGs in the UE's HPLMN. The absence of this leaf indicates that IP address is not configured for this ePDG in the UE's HPLMN by the home operator.

The IPAddr node 536 may be associated with a node <X>538. The node 538 may act as a placeholder for an IP address of an ePDG in the UE's HPLMN.

The <X> node 538 may be associated with an AddressType leaf 540. The AddressType leaf 540 may indicate the type of IP address format, or version, of an IP address of an ePDG in the UE's HPLMN. The leaf 540 may have values indicating IPv4 format or IPv6 format.

The <X> node 538 may be associated with an Address leaf 542. The Address leaf may indicate the IP address of the ePDG IP Address in the UE's HPLMN. The leaf 542 may have values indicating an IP address. The value of this leaf is an IPv4 address if the AddressType leaf value of the same rule is equal to IPv4. The value of this leaf is an IPv6 address if the AddressType leaf value of the same rule is equal to IPv6.

The N3AN node configuration information represented by object 500 may be provided to the UE by a network node, such as the UE's home policy control function (PCF), or may be provided to the UE via USIM provisioning. If the UE is both 5G and 4G capable, the UE may receive, from the PCF, the N3AN_node management object 500 and an Access Network Discovery and Selection Function (ANDSF) management object from a 4G ANDSF server.

Figure 6A:
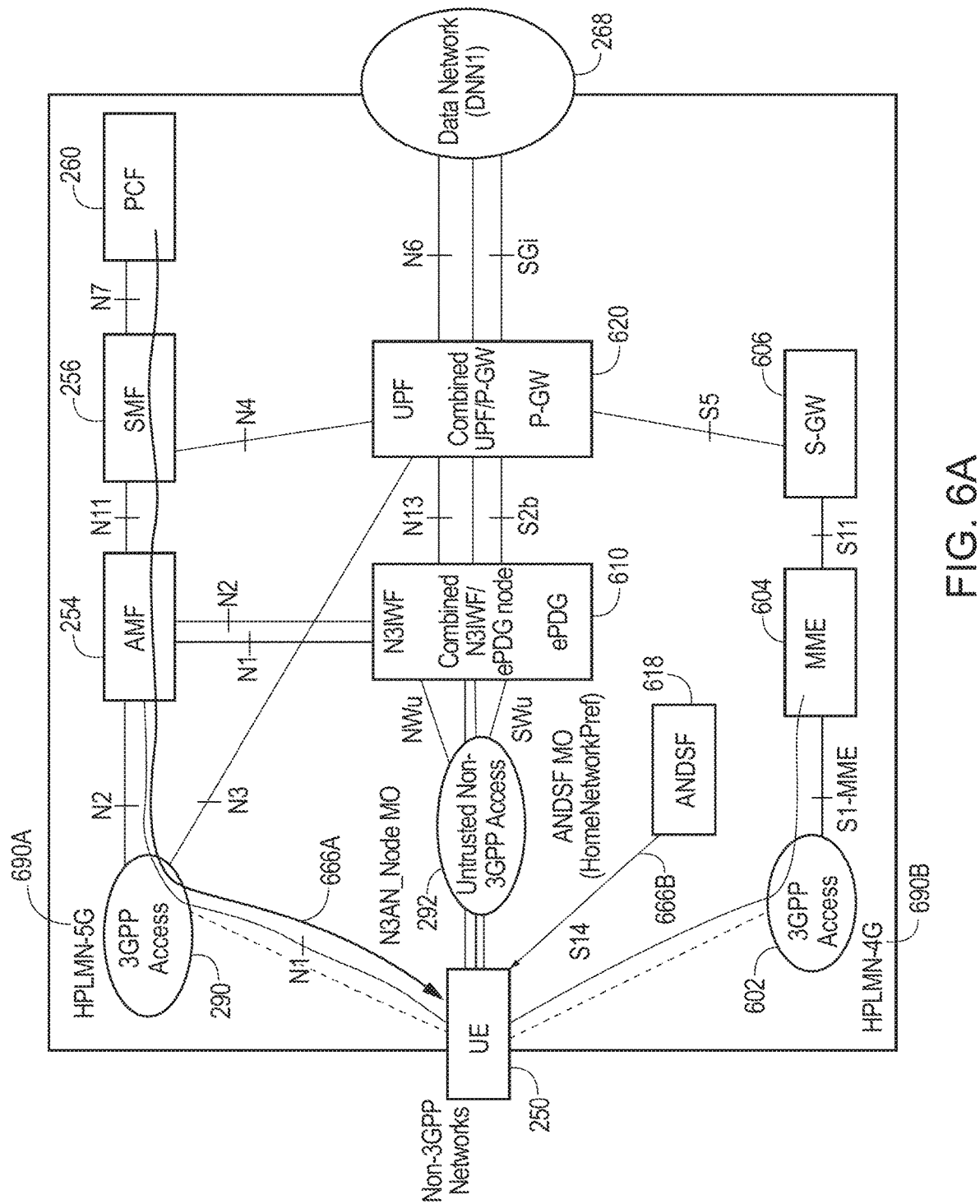
FIG. 6A-6B depict portions of a 5G-HPLMN and portions of a 4G-HPLMN, in accordance with some example embodiments.

FIG. 6A depicts a portion of a 5G-HPLMN 690 and a portion of a 4G-HPLMN, although VPLMN(s) may be implemented as well. FIG. 6A depicts a combined N3IWF ePDG node 610 and a combined UPF and packet gateway (P-GW) node 620. FIG. 6A depicts the 3GPP access, MME 604, and serving gateway 606.

FIG. 6A depicts that the UE 250 may receive, at 666A, a N3AN_node management object 500 from the PCF 260. Alternatively or additionally, the UE 250 may receive, at 666B, a management object, such as an ANDSF management object from a 4G ANDSF server 618.

Figure 6B:
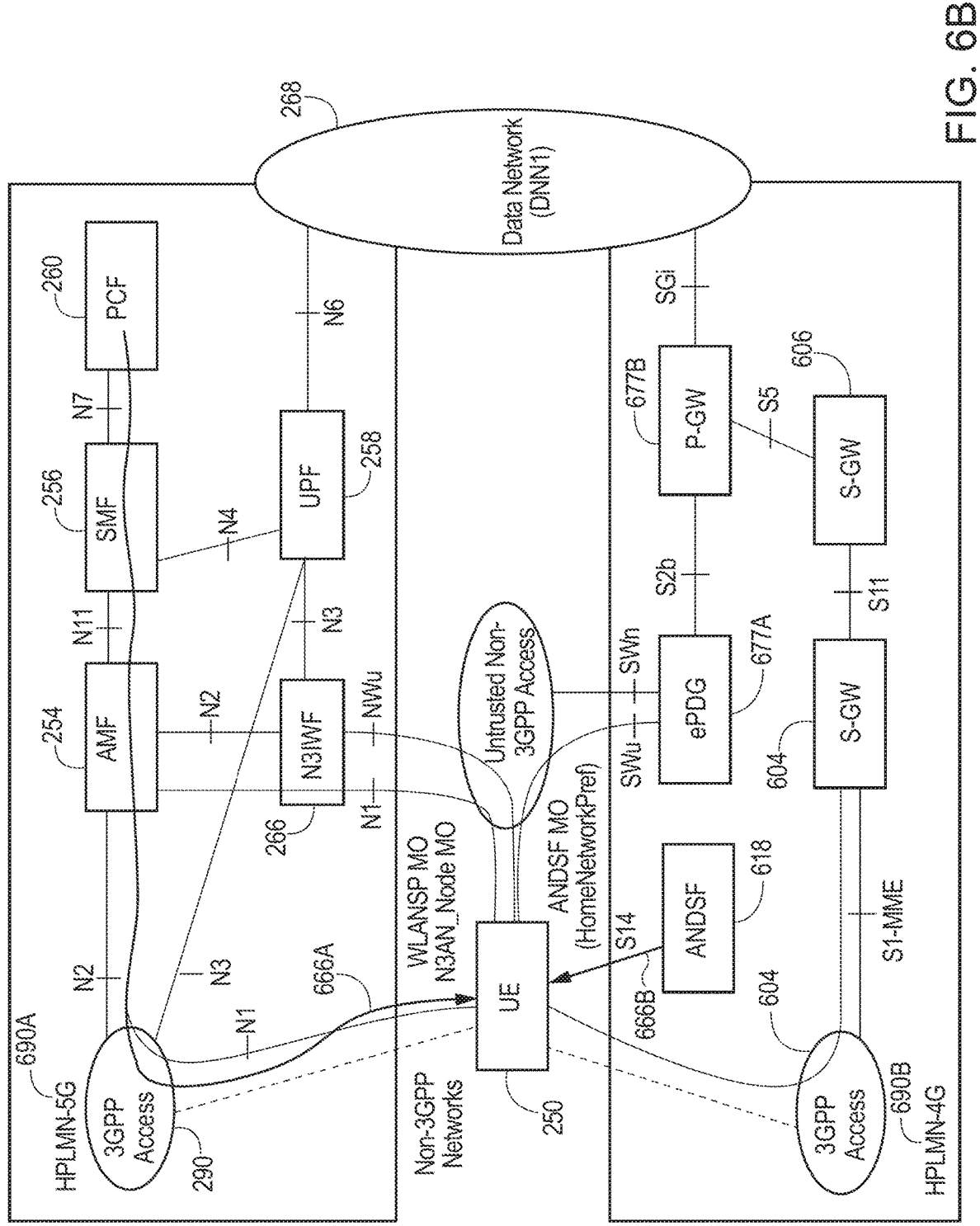

FIG. 6B depicts the non-co-located example in which the ePDG 677A is not co-located with the N3IWF 266 and the P-GW 677B is not co-located with the UPF 258. As shown at FIG. 6B, the UE 250 may receive, at 666A, a N3AN_node management object 500 from the PCF 260. Alternatively or additionally, the UE 250 may receive, at 666B, a management object, such as an ANDSF management object from a 4G ANDSF server 618.

When the UE supports connectivity to both N3IWF and ePDG, the there may be provided a "normal" use case and an "abnormal" use case handling logic for interception-aware access node selection.

If the the visited country mandates the selection of a non-3GPP access network (N3AN) node in the visiting country and the 5G N3IWF is preferred, the UE may perform the DNS NAPTR query using visited country FQDN as follows:

n3iwf.5gc.mcc<MCC>.visited-country.pub.3gppnetwork.org.

If the result of this query is a set of one or more records containing the service instance names of the form "n3iwf.5gc.mnc<MNC>.mcc<MCC>.pub.3gppnetwork.org" (where the (<MCC>, <MNC>) pair in each record represents PLMN Id in the visited country), the UE may determine that the visited country mandates the selection of the N3IWF in the visited country. If however, the query results do not contain the service instance names of the form "n3iwf.5gc.mnc<MNC>.mcc<MCC>.pub.3gppnetwork.org", the UE may determine that the visited country does not mandate the selection of the N3IWF in the visited country. Moreover, if the ePDG is preferred over the N3IWF, the UE may perform the DNS NAPTR query using the Visited Country FQDN for the ePDG.

Figure 7A:
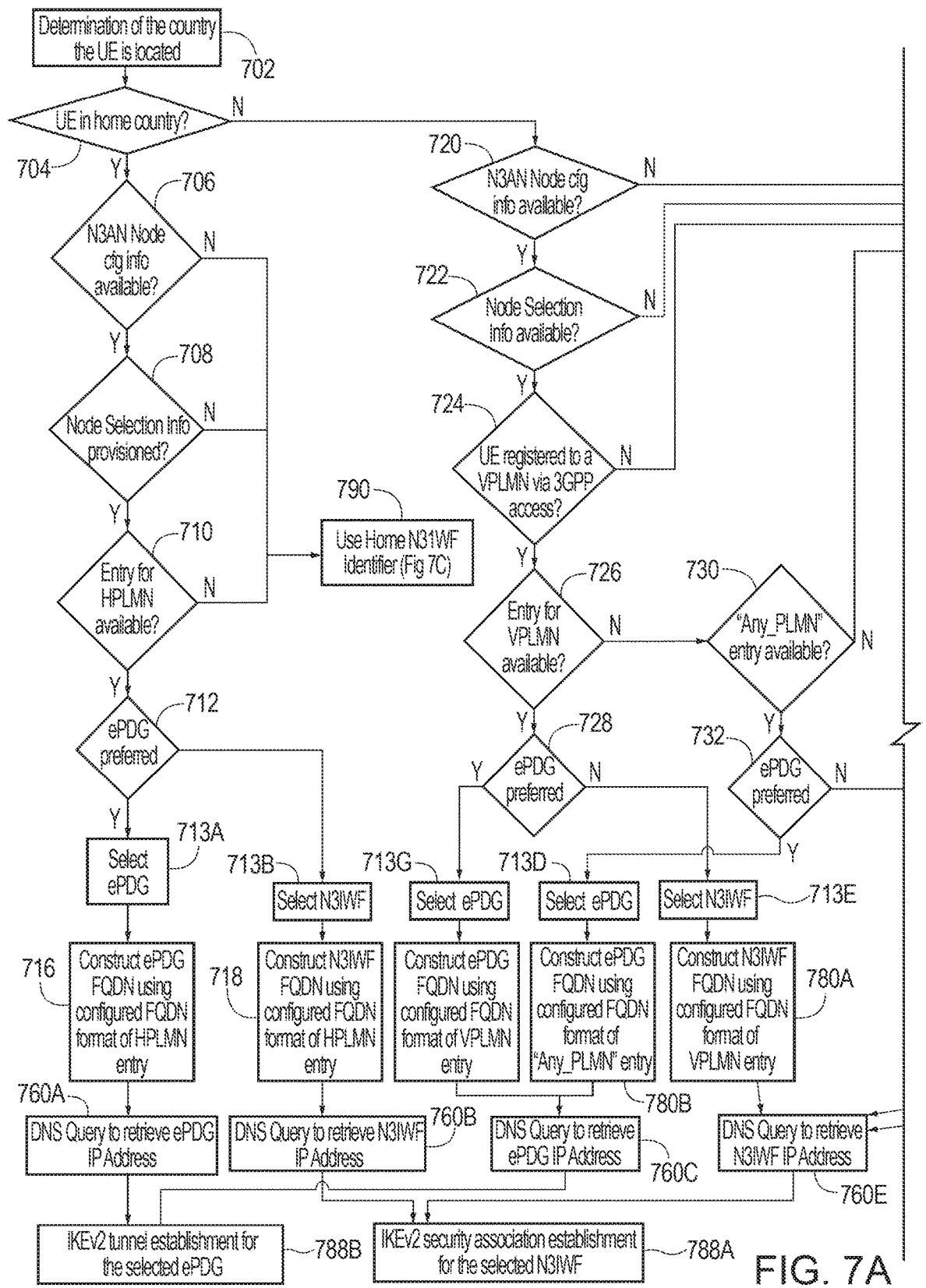
FIGS. 7A-7C depict an example process, when the UE supports connectivity with the N3IWF and the ePDG, in accordance with some example embodiments.
Figure 7B:
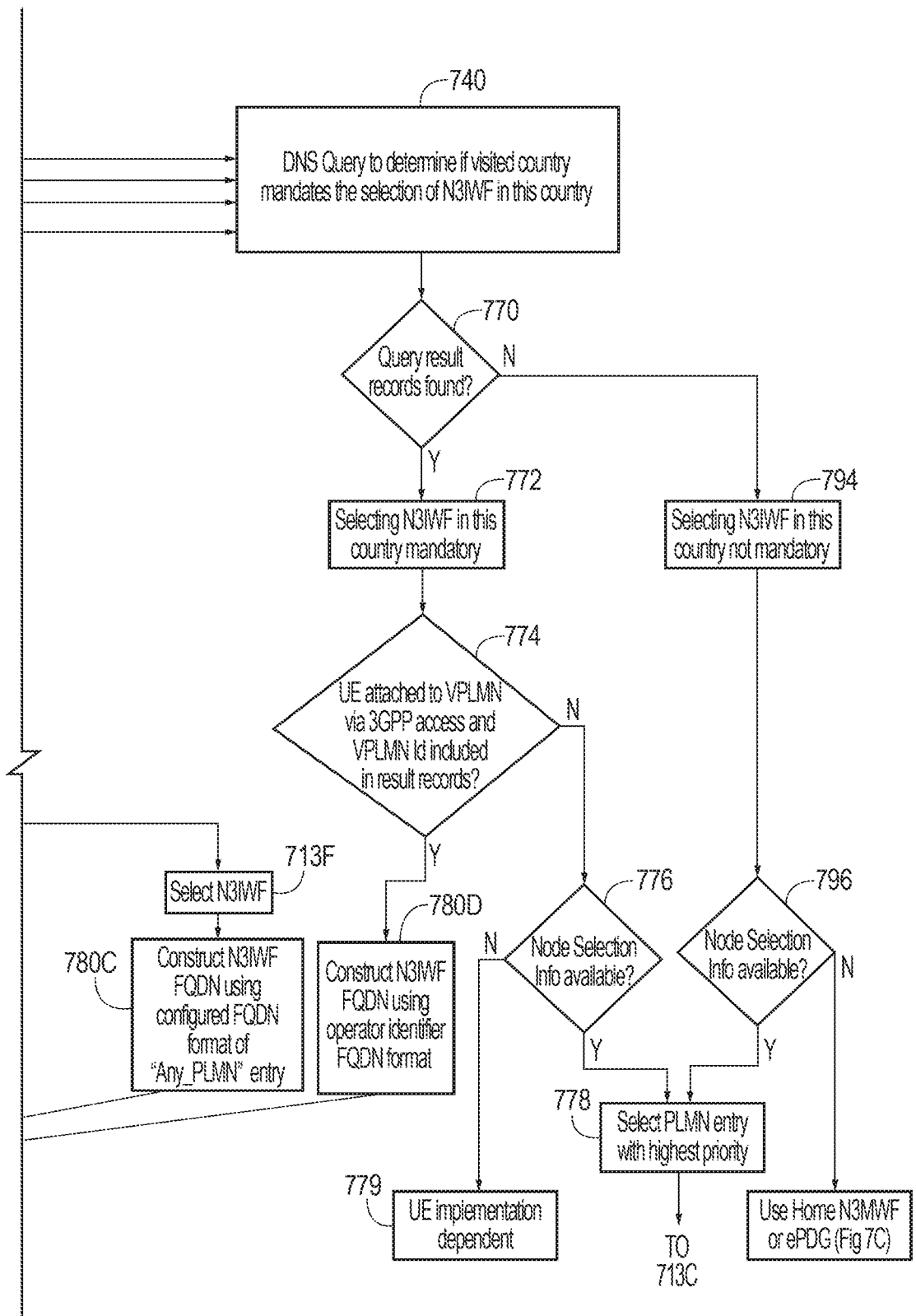

FIG. 7A depicts an example process, when the UE supports connectivity with N3IWF and with ePDG, in accordance with some example embodiments. The process of FIG. 7A may provide selection logic for selecting the N3IWF, ePDG, or both.

If the UE 250 can support connectivity with the N3IWF 266 and with the ePDG 677A, the UE may use the N3AN ePDG preferred parameter 544 in the N3AN node selection information 120 to determine whether selection of the N3IWF or the ePDG is preferred in a given PLMN. If the N3AN ePDG preferred parameter 544 is not configured for a given PLMN such as an HPLMN or a VPLMN, the UE may consider that the N3IWF 266 is preferred for the give PLMN.

If the UE 250 is located in its home country (702 and Y at 704), the N3AN node selection information 120 is provisioned in the N3AN node configuration information (Y at 706 and Y at 708), an entry for the HPLMN is available in the N3AN node selection information (Y at 710), and the N3AN ePDG preferred parameter 594 for the HPLMN entry indicates that N3IWF is preferred (N at 712), the UE may select the N3IWF, at 713B, and then construct, at 718, an N3IWF FQDN based on configured FQDN format of HPLMN.

If the UE is located in its home country (702 and Y at 704), the N3AN node selection information is provisioned in the N3AN node configuration information (Y at 706 and Y at 708), an entry for the HPLMN is available in the N3AN node selection information (Y at 710), and the N3AN ePDG preferred parameter for the HPLMN entry indicates that ePDG is preferred (Y at 712), the UE may select, at 713A, the ePDG and then construct, at 716, an ePDG FQDN based on configured FQDN format of HPLMN.

If the UE is located in its home country (702 and Y at 704), the N3AN node selection information is not provisioned in the N3AN node configuration information (N 708) or the N3AN node selection information 120 is provisioned (Y at 708), and an entry for the HPLMN is not available at 710 in the N3AN node selection information (N at 710), and:
  i) if Home N3IWF identifier is provisioned in the N3AN node configuration information (Y at 792A), the UE uses, at 792D, the configured IP address to select the N3IWF, or if configured IP address is not available (N at 792C), construct, at 792D, an N3IWF FQDN using the configured FQDN;
  ii) if the Home N3IWF identifier is not provisioned (N at 792A) but Home ePDG identifier is provisioned in the N3AN node configuration information (Y at 792E), the UE may construct, at 792H, an ePDG FQDN based on the Operator Identifier FQDN format using the PLMN ID of the HPLMN; and
  iii) if neither the Home N3IWF identifier (N at 792A) nor the Home ePDG identifier (N at 792E) is provisioned in the N3AN node configuration information, the UE may construct, at 792I, an N3IWF FQDN based on the Operator Identifier FQDN format using the PLMN ID of the HPLMN.

If the UE is located in its home country (702 and Y at 704), the N3AN node configuration information is not configured on the UE, or the N3AN node configuration information is configured but empty, the UE may construct the N3IWF FQDN based on the Operator Identifier FQDN format using the PLMN ID of the HPLMN stored on the USIM. In the case as USIM, the UE may operate in a manner similar with respect to access node selection as in the object download examples described herein save for the provisioning into the USIM (rather than reception from a PCF). In the case of USIM, the USIM may be provisioned with a first EF (e.g., $EF_{N3IWFId}$) including the N3IWF identifier and a second EF file (e.g., $EF_{nodeSelection}$) including N3IWF selection information.

The UE may use, at 760A-E, the DNS server function to resolve the constructed N3IWF FQDN or ePDG FQDN to the IP address(es) of the N3IWF(s) or ePDG(s). The UE may select an IP address of an N3IWF or an ePDG with the same IP version as its local IP address.

If the UE 250 is not located in its home country (N at 704), the N3AN node selection information 129 is provisioned in the N3AN node configuration information (Y at 720), the UE is registered to a VPLMN via 3GPP access (Y at 724), and:
  i) if an entry for the VPLMN is available (see, e.g., 124 at FIG. 5 showing a list of PLMN entries, which may be a HPLMN or a VPLMN)) at 726 in the N3AN node selection information (722), and:
    A) if the N3AN ePDG preferred parameter at 728 for the VPLMN entry indicates that N3IWF is preferred (N at 728), the UE may select, at 713E the N3IWF and construct, at 780A, an N3IWF FQDN based on configured FQDN format of the VPLMN; and
    B) if the N3AN ePDG preferred parameter for the HPLMN entry indicates that ePDG is preferred (Y at 728), the UE may select, at 713D, the ePDG and then construct, at 780B, an ePDG FQDN based on configured FQDN format of the VPLMN;
  ii) if an entry for the VPLMN is not available in the N3AN node selection information (N at 726) and an 'Any_PLMN' entry is available in the N3AN node selection information (Y at 730), and:
    A) if the N3AN ePDG preferred parameter for the 'Any_PLMN' entry indicates that N3IWF is preferred (N at 732), the UE may select, at 713F, the N3IWF and then construct, at 780C, an N3IWF FQDN based on configured FQDN format of the 'Any_PLMN'; and
    B) if the N3AN ePDG preferred parameter for the 'Any_PLMN' entry indicates that ePDG is preferred (Y at 732), the UE may select, at 713D, the ePDG and then construct, at 780B, an ePDG FQDN based on configured FQDN format of the 'Any_PLMN'.

The UE uses, at 760C/760E, the DNS server function to resolve the constructed N3IWF FQDN or ePDG FQDN to the IP address(es) of the N3IWF(s) or ePDG(s). The UE may select an IP address of an N3IWF or ePDG with the same IP version as its local IP address.

The UE may perform a DNS query, at 740, to determine if the visited country mandates the selection of N3IWF in this country, if the UE is not located in its home country (N at 704), and one or more of the following is true:
  the UE is not registered to a PLMN via 3GPP access (N at 724) and the UE uses WLAN;
  the N3AN node configuration information (N at 720) is not configured;
  the N3AN node selection information is not provisioned (N at 722) in the N3AN node configuration information; or
  the UE is registered to a VPLMN via 3GPP access (Y at 724) and an entry for the VPLMN is not available in the N3AN node selection information (N at 726) and an 'Any_PLMN' entry is not available (N at 730) in the N3AN node selection information.

If the query result at 770 indicates at 772 that the selection of N3IWF in the visited country is mandatory, the UE is registered to a VPLMN via 3GPP access and the PLMN ID of VPLMN is included in one of the returned DNS records (Y at 774), the UE may select an N3IWF in this VPLMN by constructing, at 780D, an N3IWF FQDN based on the Operator Identifier FQDN format using the PLMN ID of the VPLMN.

If the query result at 770 indicates at 772 that the selection of N3IWF in the visited country is mandatory, the UE is not registered to a PLMN via 3GPP access or the UE is registered to a VPLMN via 3GPP access and the PLMN ID of VPLMN is not included in any of the DNS records (N at 774), the UE may select, at 778, an N3IWF from a PLMN included in the DNS response that has a highest PLMN priority in the N3AN node selection information and construct an N3IWF FQDN based on the configured FQDN format of the PLMN entry, when the N3AN node selection information is provisioned at 776.

At 776 however, if the N3AN node selection information is not provisioned or the N3AN node selection information does not contain any of the PLMNs in the DNS response, the selection at 779 of the PLMN is UE implementation specific. As such, the UE may select an N3IWF from a PLMN included in the DNS response and construct an N3IWF FQDN based on the Operator Identifier FQDN format using the PLMN ID of the PLMN.

As noted, the UE may use the DNS server function to resolve the constructed N3IWF FQDN to the IP address(es) of the N3IWF(s). The UE may select an IP address of an N3IWF with the same IP version as its local IP address.

If the DNS response contains no records (N at 770), selection of N3IWF in visited country is not mandatory (at 794), the N3AN node selection information is provisioned and contains one or more PLMNs in the visited country (Y at 796), the UE may select, at 778, an N3IWF from a PLMN that has a highest PLMN priority in the N3AN node selection information.

Figure 7C:
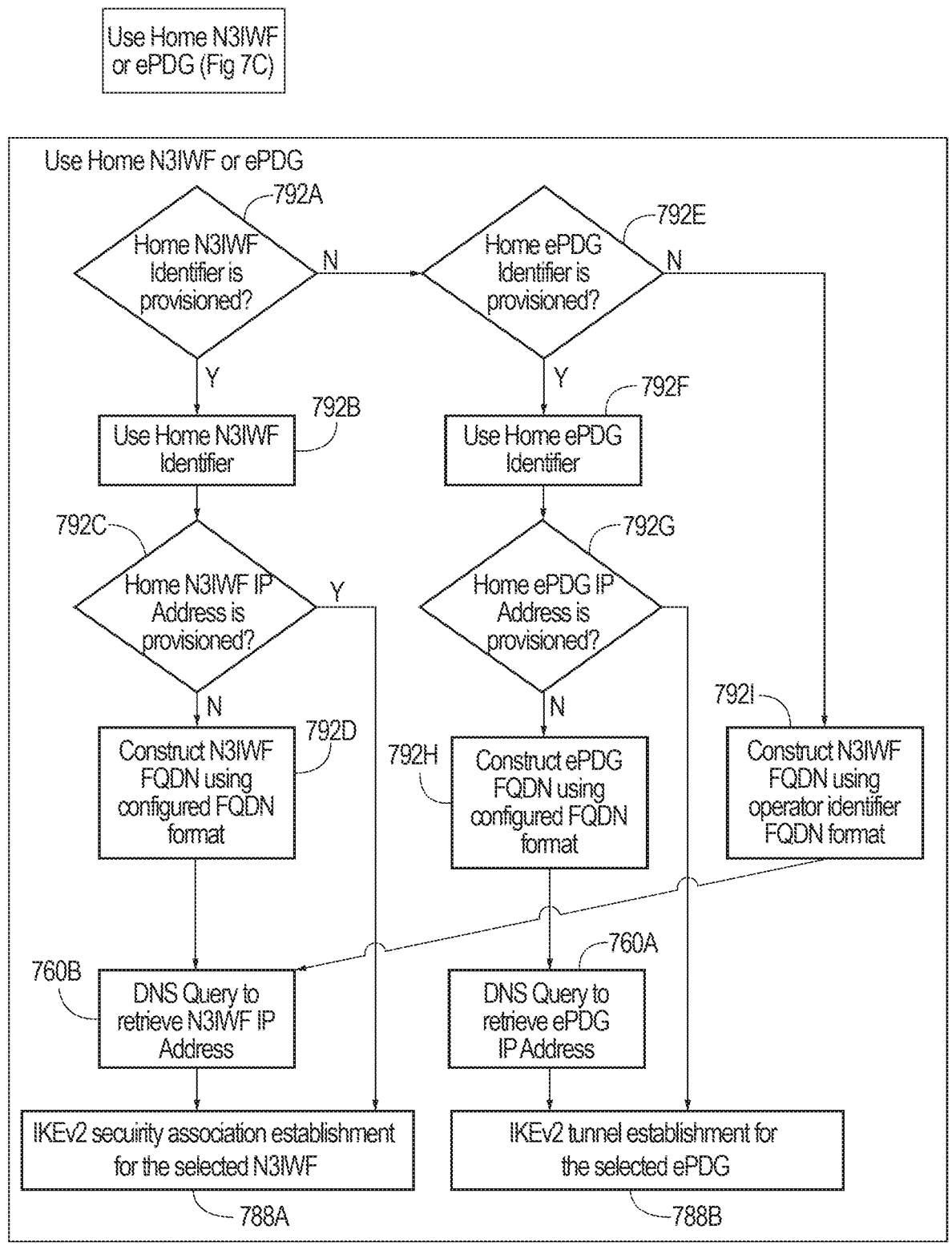

If the N3AN node selection information is not provisioned however (N 796) or if the N3AN node selection information is provisioned and contains no PLMN in the visited country, the UE may select an N3IWF in the HPLMN in accordance with FIG. 7C.

If no DNS response is received in response to the query at 7490, the UE may terminate the N3IWF selection procedure.

When the UE selected IP address of the N3IWF or ePDG is determined, the UE may, if the N3IWF is selected,
  i) initiate the IKEv2 SA establishment procedure;
  ii) if selecting an N3IWF in the HPLMN fails and the selection of N3IWF in the HPLMN is performed using Home N3IWF identifier configuration, and there are more pre-configured N3IWFs in the HPLMN, the UE may repeat the tunnel establishment attempt using the next FQDN or IP address(es) of the N3IWF in the HPLMN; and
  iii) if the UE does not receive a response to an IKE_SA_INIT request message sent towards any of the received IP addresses of the selected N3IWF, the UE may repeat the N3AN node selection, excluding the N3IWFs for which the UE did not receive a response to the IKE_SA_INIT request message.

But if the ePDG is selected, the UE may:
  i) initiate 4G tunnel establishment;
  ii) if selecting an ePDG in the HPLMN fails and the selection of ePDG in the HPLMN is performed using Home ePDG identifier configuration, and there are more pre-configured ePDG in the HPLMN, the UE may repeat the tunnel establishment attempt using the next FQDN or IP address(es) of the ePDG in the HPLMN; and
  iii) if the UE does not receive a response to an IKE_SA_INIT request message sent towards any of the received IP addresses of the selected ePDG, the UE may repeat the N3AN node selection, excluding the ePDGs for which the UE did not receive a response to the IKE_SA_INIT request message.

Figure 8A:
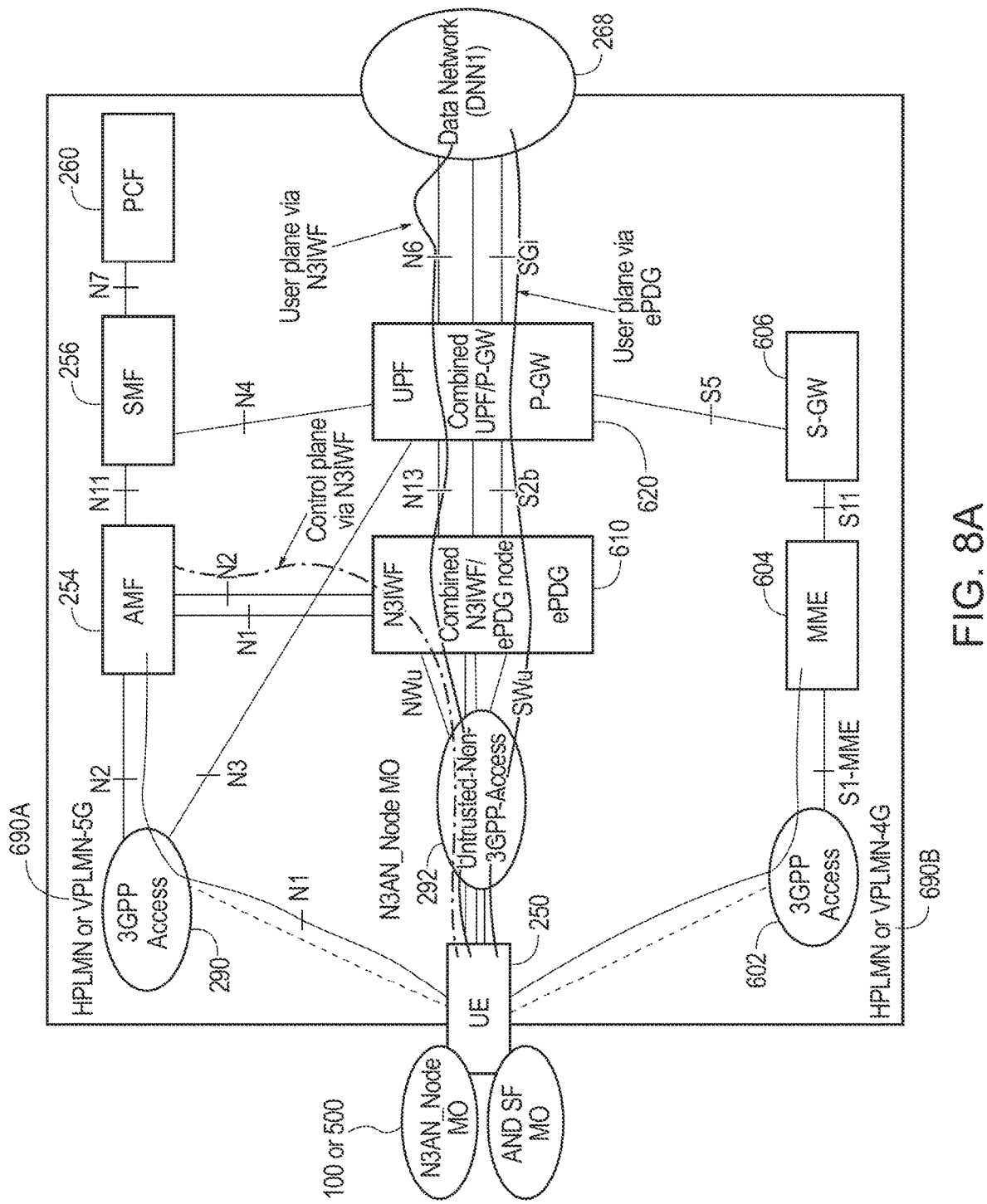
FIGS. 8A-8B depicts the UE connectivity to the data network after IKEv2 signaling security association and user plane security association establishment following N3IWF selection, in accordance with some example embodiments.
Figure 8B:
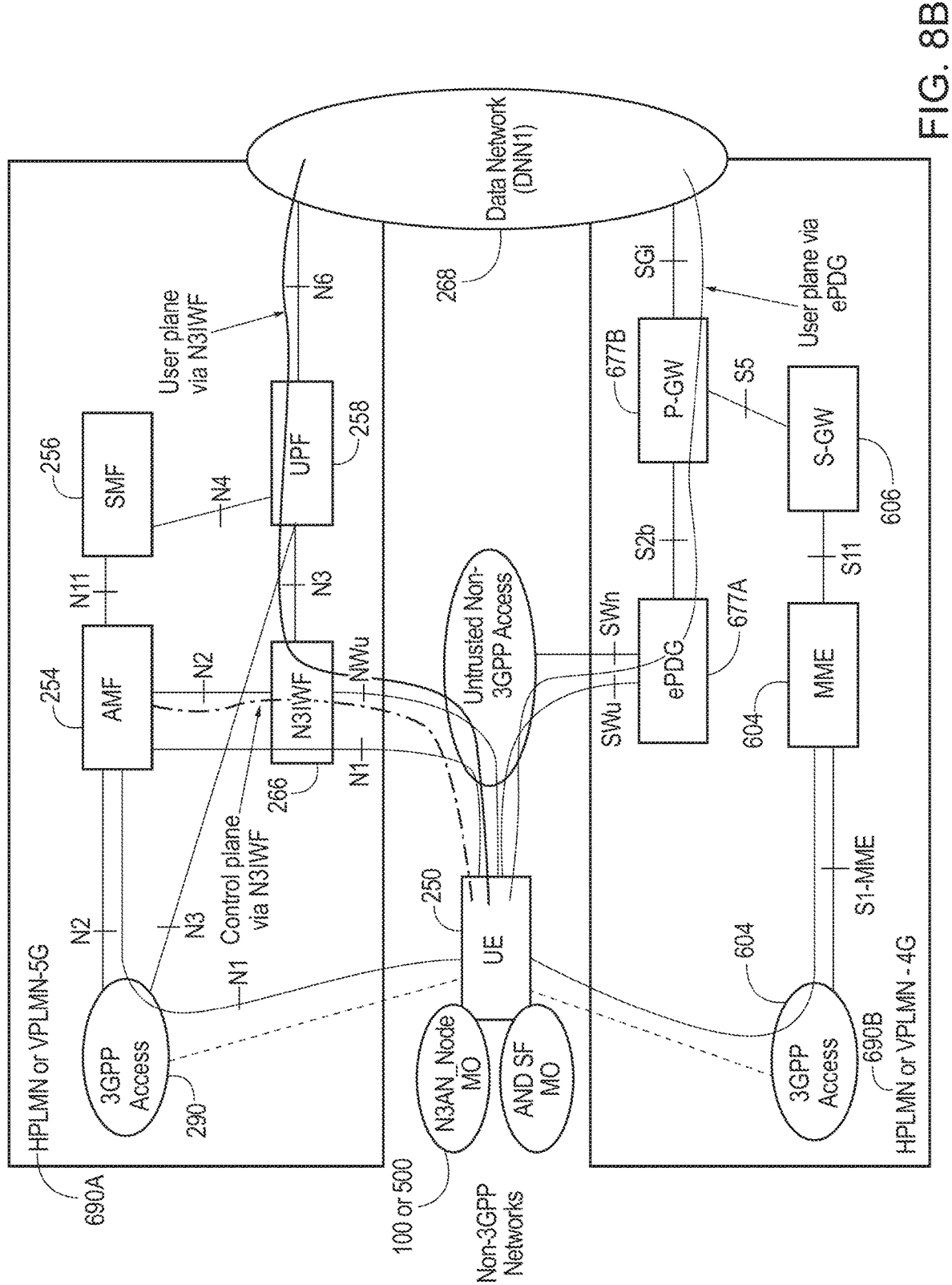

FIG. 8A shows the UE connectivity to the data network 268 after IKEv2 signaling SA and user plane SA establishment following N3IWF selection or after IKEv2 tunnel establishment following ePDG selection. FIG. 8A depicts co-located N3IWF and ePDG 610, while FIG. 8B depicts a separate ePDG and P-GW. The PLMN-5G and PLMN-4G can be the UE's home PLMN (HPLMN) or a visited PLMN (VPLMN), and PLMN-5G and PLMN-4G may belong to the same operator or different operators.

Figure 9:
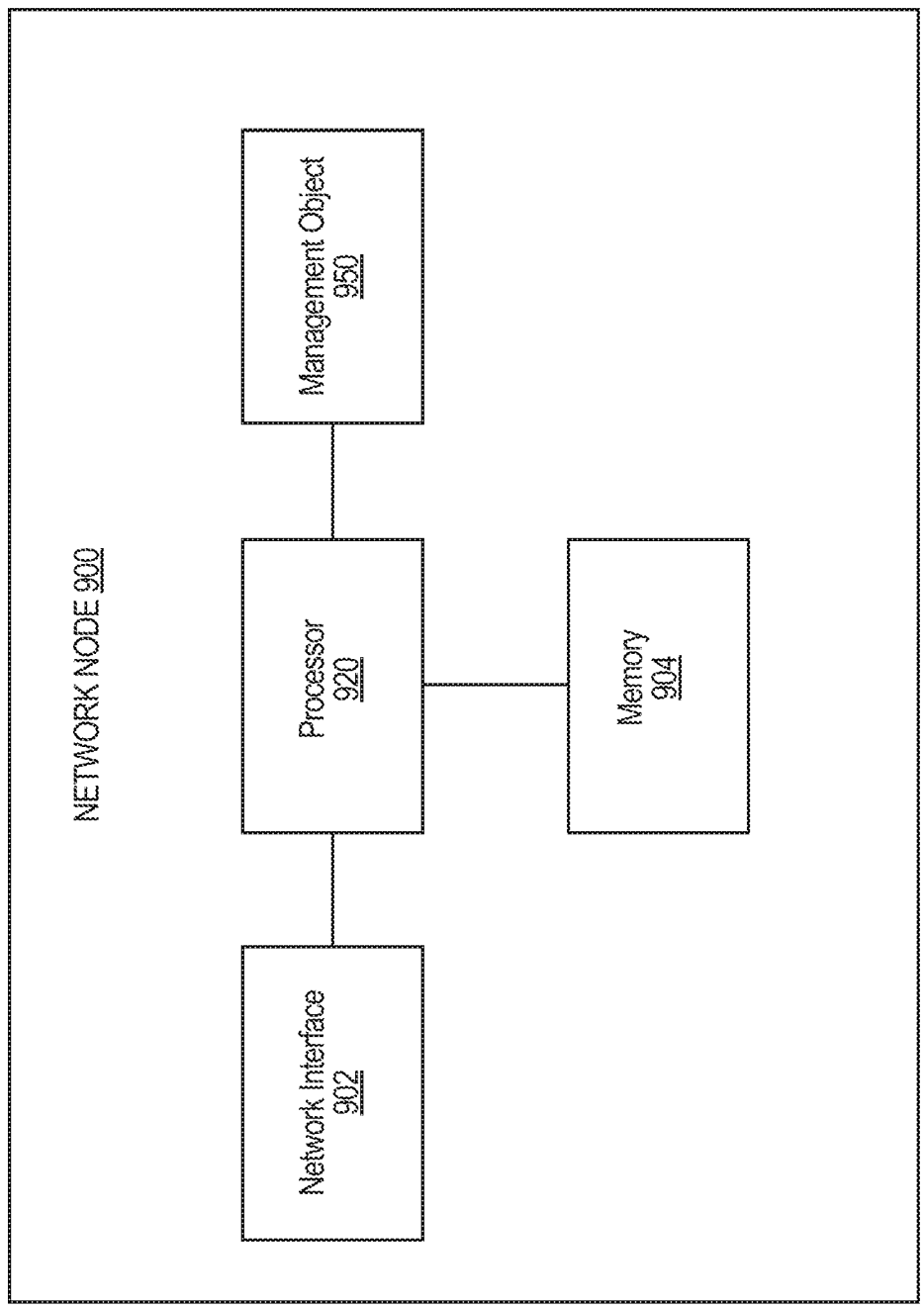
FIG. 9 depicts an example of a network node, in accordance with some example embodiments.

FIG. 9 depicts a block diagram of a network node 900, in accordance with some example embodiments. The network node 900 may be configured to handle access node selection to the HPLMN and/or VPLMN as disclosed herein. The node 900 may also provide information to the UE, such as management objects 100, 500, and/or the like. For example, the network node 900 may be incorporated into one or more of the PCF, ANDSF server, and/or the like.

The network node 900 may include a network interface 902, a processor 920, a memory 904, and a management object store or generator 950 for providing the management object to a UE to enable access node selection, in accordance with some example embodiments. The network interface 902 may include wired and/or wireless transceivers to enable access other nodes, the Internet, and/or other nodes. The memory 904 may comprise volatile and/or non-volatile memory including program code, which when executed by at least one processor 920 provides, among other things, the processes disclosed herein including processes at FIGS. 3A, 3B, 3C, 6A, 6B, 7A, 7B, 7C, and/or the like. For example, the node 900 may be implemented to provide the PCF, N3IWF, ePDG, and/or the like.

Figure 10:
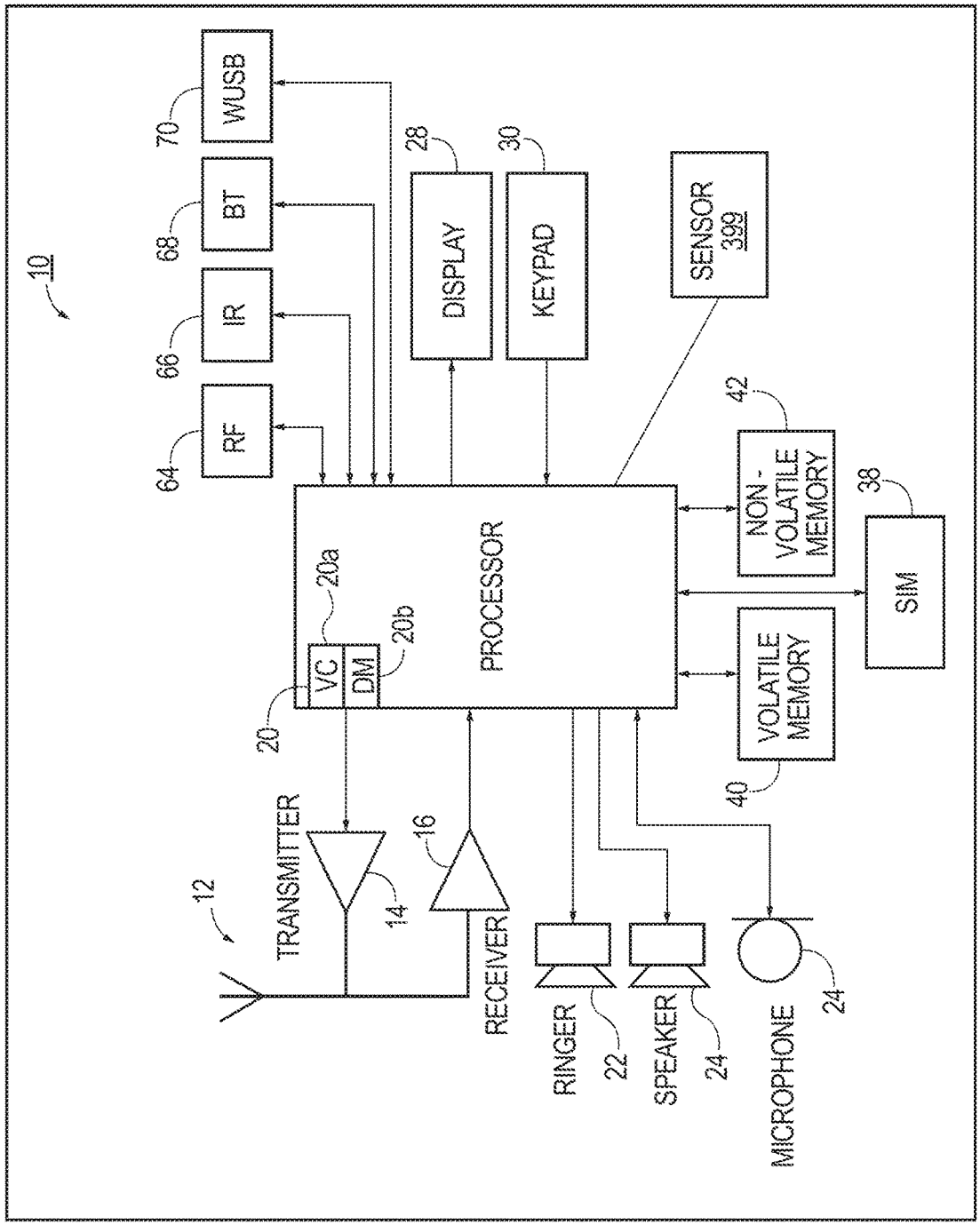
FIG. 10 depicts an example of an apparatus, in accordance with some example embodiments.

FIG. 10 illustrates a block diagram of an apparatus 10, in accordance with some example embodiments.

The apparatus 10 may represent a user equipment, such as the user equipment 250.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 10 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 10, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including obtain information to enable selection of an access node for a non-GPP access; query a server to determine whether the country at which the access node is located requires lawful interception of communications; and select, based at least on the obtained information and/or a response to the query, an access node for the non-3GPP access.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to obtain information to enable selection of an access node for a non-GPP access; query a server to determine whether the country at which the access node is located requires lawful interception of communications; and select, based at least on the obtained information and/or a response to the query, an access node for the non-3GPP access.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced access node selection.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:
1. An apparatus comprising:
at least one processor; and
at least one memory including computer program code, the at least one memory and the computer program code configured to, with the at least one processor, cause the apparatus to at least:
obtain provisioning information, from a home network, to enable selection of an access node for access between at least a first access node comprising an interworking function, being at least one of a non-3GPP interworking function or a non-cellular interworking function for accessing a first core network via a non-3GPP access, and a second access node comprising an evolved packet data gateway for accessing a second core network via a non-3GPP access;
wherein the provisioning information comprises at least a non-3GPP access network node configuration information to enable selection of the access node, wherein an internet protocol (IP) address of the first access node has the same IP version as a local IP address of the apparatus, wherein the non-3GPP access network node configuration information comprises
  access node selection information comprising at least access node type preference for a particular access node type among a plurality of access node types for a particular public land mobile network (PLMN) and a fully qualified domain name (FQDN) format configuration of a list of public land mobile network (PLMNs);
  home network non-3GPP interworking function (N3IWF) access node configuration of the home public land mobile network (HPLMN); and
  home network evolved packet data gateway access node (EPDG) configuration of the home public land mobile network (HPLMN);
determine configuration information to be used for selection of the access node for an accessing network;
select, based on at least one of the provisioning information or determined configuration information, the access node for the access, wherein the access is at least one of non-3GPP access or non-cellular access; and
connect to the selected access node for access to the first core network or the second core network,
wherein the first core network is accessed if the first access node is selected, or the second core network is accessed if the second access node is selected, and
wherein the apparatus is not located in its home country, and wherein to determine the configuration information, the apparatus is further caused to query a server to determine whether a country at which the access node is located requires lawful interception, the response including a list of one or more interworking function nodes, being at least one of a non-3GPP interworking function or a non-cellular interworking function, supporting the lawful interception of communications.

2. The apparatus of claim 1, wherein the apparatus is further caused to support only one access node type and a home network access node configuration information of the HPLMN corresponding to the supported access node type is used for selecting the access node.

3. The apparatus of claim 2, wherein the access node type is a non-3GPP interworking function (N3IWF), and the home network non-3GPP interworking function access node configuration of the HPLMN is used to obtain N3IWF address information, and the apparatus connects to the selected N3IWF for access to a core network.

4. The apparatus of claim 3, wherein the home N3IWF identifier contains only FQDN instead of IP address, and the apparatus is further caused to initiate DNS query to retrieve N3IWF's IP address by constructing an N3IWF FQDN based on the configured FQDN of the home N3IWF identifier.

5. The apparatus of claim 3, wherein the home N3IWF identifier information is not provisioned in the non-3GPP access network node configuration information, the apparatus is then further caused to initiate DNS query to retrieve N3IWF's IP address by constructing an N3IWF FQDN based on FQDN format of the HPLMN configured in the access node selection information using the PLMN ID of the HPLMN stored in the universal subscriber identity module.

6. The apparatus of claim 2, wherein the access node type is an evolved packet data gateway (ePDG), and the home network evolved packet data gateway access node configuration of the HPLMN is used to obtain ePDG address information, and the apparatus connects to the selected ePDG for access to a core network.

7. The apparatus of claim 1, wherein the apparatus is further caused to only support one access node type and the access node selection information of the visited PLMN is used for obtaining the access node address information.

8. The apparatus of claim 1 wherein the apparatus is further caused to support the plurality of access node types as the access node and the access node selection information of the visited PLMN is used for obtaining the access node type preference information.

9. The apparatus of claim 8, wherein the access node selection information of the visited PLMN indicates preference of one access node type, the apparatus is then further caused to initiate DNS query to retrieve the IP address information of the preferred access node type by constructing a FQDN based on the FQDN format of the visited PLMN configured in the access node selection information using the PLMN ID of the visited PLMN.

10. The apparatus of claim 1, wherein the apparatus is caused to only support one access node type as the access node and the access node configuration information of the HPLMN is not configured, wherein the apparatus is further caused to select home N3IWF node for access to a core network.

11. The apparatus of claim 1, wherein the apparatus is caused to only support one access node type and has no configuration of the access node selection information, and wherein the apparatus is further caused to perform a DNS query to determine if the selection of N3IWF is mandatory.

12. The apparatus of claim 1, wherein the apparatus is caused to only support one access node type, use WLAN and not be registered to a PLMN via 3GPP access, and wherein the apparatus is further caused to perform a DNS query to determine if the selection of N3IWF is mandatory.

13. The apparatus of claim 1, wherein the apparatus is caused to support the plurality of access node types as the access node and has no configuration of the access node selection information, and wherein the apparatus is further caused to perform a DNS query to determine if the selection of N3IWF is mandatory.

14. The apparatus of claim 1, wherein the apparatus is caused to support the plurality of access node types as the access node, use WLAN and not be registered to a PLMN via 3GPP access, and wherein the apparatus is further caused to perform a DNS query to determine if the selection of N3IWF is mandatory.

15. A method comprising:
  obtaining, at a user equipment, provisioning information from a home network of the user equipment, to enable selection of an access node for access between at least a first access node comprising an interworking function, being at least one of a non-3GPP interworking function or a non-cellular interworking function for accessing a first core network via a non-3GPP access, and a second access node comprising an evolved packet data gateway for accessing a second core network via a non-3GPP access;
  wherein the provisioning information comprises at least a non-3GPP access node configuration information to enable selection of the access node, wherein an internet protocol (IP) address of the first access node has the same IP version as a local IP address of the user equipment, wherein the non-3GPP access network node configuration information comprises
  access node selection information comprising at least access node type preference for a particular access node type among a plurality of access node types for a particular public land mobile network (PLMN) and a fully qualified domain name (FQDN) format configuration of a list of public land mobile network (PLMNs);
home network non-3GPP interworking function (N3IWF) access node configuration of the home public land mobile network (HPLMN); and
home network evolved packet data gateway access node (EPDG) configuration of the home public land mobile network (HPLMN);
determining configuration information to be used for the selection of the access node for an accessing network;
selecting, based on at least one of the provisioning information or determined configuration information, the access node for the access, wherein the access is at least one of non-3GPP access or non-cellular access; and
connecting to the selected access node for access to the first core network or the second core network,
wherein the first core network is accessed if the first access node is selected, or the second core network is accessed if the second access node is selected, and
wherein the user equipment is not located in its home country, and to determine the configuration information, the method further comprises querying a server to determine whether a country at which the access node is located requires lawful interception, the response including a list of one or more interworking function nodes, being at least one of a non-3GPP interworking function or a non-cellular interworking function, supporting the lawful interception of communications.

16. The method of claim 15, wherein the access node type is a non-3GPP interworking function (N3IWF), and the home network non-3GPP interworking function access node configuration of the HPLMN is used to obtain N3IWF address information, and the user equipment connects to the selected N3IWF for access to a core network.

17. The method of claim 15, wherein the access node type is an evolved packet data gateway (ePDG), and the home network evolved packet data gateway access node configuration of the HPLMN is used to obtain ePDG address information, and the user equipment connects to the selected ePDG for access to a core network.

18. The method of claim 15, wherein the user equipment is not located in its home country.

19. The method of claim 18, wherein the user equipment supports the plurality of access node types as the access node and the access node selection information of the visited PLMN is used for obtaining the access node type preference information.

20. The method of claim 18, wherein the user equipment only supports one access node type and the access node selection information of the visited PLMN is used for obtaining the access node address information.

21. The method of claim 18, wherein the user equipment only supports one access node type and has no configuration of the access node selection information, and wherein the user equipment is further caused to perform a DNS query to determine if the selection of N3IWF is mandatory.

22. The method of claim 18, wherein the user equipment only supports one access node type, use WLAN and not be registered to a PLMN via 3GPP access, and wherein the user equipment is further caused to perform a DNS query to determine if the selection of N3IWF is mandatory.

23. A non-transitory computer-readable storage medium including program code which when executed by at least one processor causes operations comprising:
receiving provisioning information, from a user equipment's home network, to enable selection of an access node for access between at least a first access node comprising an interworking function, being at least one of a non-3GPP interworking function or a non-cellular interworking function for accessing a first core network via a non-3GPP access, and a second access node comprising an evolved packet data gateway for accessing a second core network via a non-3GPP access;
wherein the provisioning information comprises at least a non-3GPP access network node configuration information to enable selection of the access node, wherein an internet protocol (IP) address of the first access node has the same IP version as a local IP address of the user equipment, wherein the non-3GPP access network node configuration information comprises
access node selection information comprising at least access node type preference for a particular access node type among a plurality of access node types for a particular public land mobile network (PLMN) and a fully qualified domain name (FQDN) format configuration of a list of public land mobile network (PLMNs);
home network non-3GPP interworking function (N3IWF) access node configuration of the home public land mobile network (HPLMN); and
home network evolved packet data gateway access node (EPDG) configuration of the home public land mobile network (HPLMN);
determining configuration information to be used for the selection of the access node for an accessing network;
selecting, based on at least one of the provisioning information or determined configuration information, the access node for the access, wherein the access is at least one of non-3GPP access or non-cellular access; and
connecting to the selected access node for access to the first core network or the second core network,
wherein the first core network is accessed if the first access node is selected, or the second core network is accessed if the second access node is selected, and
wherein the user equipment is not located in its home country, the program code which when executed by the at least one processor further causes operations comprising, and wherein to determine the configuration information, querying a server to determine whether a country at which the access node is located requires lawful interception and receiving a response to the query, the response including a list of one or more interworking function nodes, being at least one of a non-3GPP interworking function or a non-cellular interworking function, supporting the lawful interception of communications.

24. An apparatus comprising:
at least one processor; and
at least one memory including computer program code, the at least one memory and the computer program code configured to, with the at least one processor, cause the apparatus to at least:
provide a user equipment with provisioning information, from a home network, to enable selection of an access node for access between at least a first access node comprising an interworking function, being at least one of a non-3GPP interworking function or a non-cellular interworking function for accessing a first core network via a non-3GPP access, and a second access node comprising an evolved packet data gateway for accessing a second core network via a non-3GPP access;
wherein the provisioning information comprises at least an access network node configuration information to enable selection of the access node, wherein an internet protocol (IP) address of the first access node has the same IP version as a local IP address of the user equipment, wherein the access network node configuration information comprises access node selection information comprising at least access node type preference for a particular access node type among a plurality of access node types for a particular public land mobile network (PLMN) and a fully qualified domain name (FQDN) format configuration of a list of public land mobile network (PLMNs);

a plurality of home network access node configurations, wherein each access node configuration represents the configuration information of a distinct access node type out of different access node types supported by a home public land mobile network (HPLMN);

receive a query for whether a country at which the access node is located requires lawful interception of communications;

provide a response to the query, the response including a list of one or more interworking function nodes, being at least one of a non-3GPP interworking function or a non-cellular interworking function, supporting the lawful interception of communications.

25. A method comprising:

providing a user equipment with provisioning information to enable selection of an access node for access between at least a first access node comprising an interworking function, being at least one of a non-3GPP interworking function or a non-cellular interworking function for accessing a first core network via a non-3GPP access, and a second access node comprising an evolved packet data gateway for accessing a second core network via a non-3GPP access;

wherein the provisioning information comprises at least an access network node configuration information to enable selection of the access node, wherein an internet protocol (IP) address of the first access node has the same IP version as a local IP address of the user equipment, wherein the access network node configuration information comprises access node selection information comprising at least access node type preference for a particular access node type among a plurality of access node types for a particular public land mobile network (PLMN) and a fully qualified domain name (FQDN) format configuration of a list of public land mobile network (PLMNs);

a plurality of home network access node configurations, wherein each access node configuration represents the configuration information of a distinct access node type out of different access node types supported by a home public land mobile network (HPLMN);

receiving a query for whether a country at which the access node is located requires lawful interception of communications;

providing a response to the query, the response including a list of one or more interworking function nodes, being at least one of a non-3GPP interworking function or a non-cellular interworking function, supporting the lawful interception of communications.

\* \* \* \* \*